(12) United States Patent
Umetsu et al.

(10) Patent No.: US 10,381,965 B2
(45) Date of Patent: Aug. 13, 2019

(54) DRIVE DEVICE AND METHOD FOR THREE-PHASE BRUSHLESS MOTOR

(71) Applicant: Hitachi Automotive Systems, Ltd., Hitachinaka-shi, Ibaraki (JP)

(72) Inventors: Takeshi Umetsu, Isesaki (JP); Naoki Okamoto, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/760,051

(22) PCT Filed: Jan. 5, 2017

(86) PCT No.: PCT/JP2017/000135
§ 371 (c)(1),
(2) Date: Mar. 14, 2018

(87) PCT Pub. No.: WO2017/122569
PCT Pub. Date: Jul. 20, 2017

(65) Prior Publication Data
US 2018/0254722 A1    Sep. 6, 2018

(30) Foreign Application Priority Data

Jan. 12, 2016    (JP) .................................. 2016-003653

(51) Int. Cl.
*H02P 6/18* (2016.01)
*H02P 6/182* (2016.01)

(52) U.S. Cl.
CPC .............. *H02P 6/186* (2013.01); *H02P 6/182* (2013.01); *H02P 2203/03* (2013.01)

(58) Field of Classification Search
CPC .......... H02P 6/182; H02P 25/22; H02P 21/22; H02P 21/26; H02K 33/14
See application file for complete search history.

(56) References Cited

U.S. PATENT DOCUMENTS

| | | |
|---|---|---|
| 2001/0045812 A1 | 11/2001 | Seki et al. |
| 2001/0050542 A1 | 12/2001 | Seki et al. |
| (Continued) | | |

FOREIGN PATENT DOCUMENTS

| | | |
|---|---|---|
| CN | 102868343 A | 1/2013 |
| JP | 2001-275387 A | 10/2001 |
| (Continued) | | |

OTHER PUBLICATIONS

International Search Report (PCT/ISA/210) issued in PCT Application No. PCT/JP2017/000135 dated Mar. 14, 2017 with English-language translation (five (5) pages).

(Continued)

*Primary Examiner* — Bickey Dhakal
*Assistant Examiner* — Zoheb S Imtiaz
(74) *Attorney, Agent, or Firm* — Crowell & Moring LLP

(57) ABSTRACT

Before sensorless control is performed on a three-phase brushless motor by sequentially switching between six energization modes each for selecting two phases to be energized from the three phases, the initial position of the rotor is estimated based on a change in a second induced voltage by: momentarily energizing the three-phase brushless motor according to each of the six energization modes, and detecting six first induced voltages each generated in a non-energized phase by the energization; calculating three induced voltage differences corresponding respectively to three non-energized phases, each induced voltage difference being a difference between two of the six first induced voltages that are detected during energization according to two energization modes that share a non-energized phase; and energizing the three-phase brushless motor according a predetermined energization mode selected based on the three induced voltage differences, and detecting the second (Continued)

induced voltage generated in a non-energized phase by the energization.

11 Claims, 28 Drawing Sheets

(56) References Cited

U.S. PATENT DOCUMENTS

| | | | |
|---|---|---|---|
| 2002/0079860 A1 | 6/2002 | Seki et al. | |
| 2008/0048598 A1 | 2/2008 | Shibuya | |
| 2013/0272899 A1* | 10/2013 | Takahata | H02P 6/182 |
| | | | 417/44.11 |
| 2014/0217936 A1 | 8/2014 | Okamoto | |
| 2016/0233803 A1 | 8/2016 | Hano | |

FOREIGN PATENT DOCUMENTS

| | | |
|---|---|---|
| JP | 2013-81369 A | 5/2013 |
| JP | 2013-183550 A | 9/2013 |
| JP | 2013-223355 A | 10/2013 |
| JP | 2014-155273 A | 8/2014 |
| WO | WO 2015/041321 A1 | 3/2015 |

OTHER PUBLICATIONS

Written Opinion (PCT/ISA/237) issued in PCT Application No. PCT/JP2017/000135 dated Mar. 14, 2017 with English-language translation (eight (8) pages).

International Preliminary Report on Patentability (PCT/IB/326, PCT/IB/338 & PCT/IB/373) issued in PCT Application No. PCT/JP2017/000135 dated Jul. 26, 2018, including English translation of document C2 (Japanese-language Written Opinion (PCT/ISA/237) previously filed on Mar. 14, 2018) (nine (9) pages).

Japanese-language Office Action issued in counterpart Japanese Application No. 2016-003653 dated Oct. 9, 2018 with partial English translation (four pages).

\* cited by examiner

ENERGIZATION MODE M1

ENERGIZATION MODE M2

ENERGIZATION MODE M3

ENERGIZATION MODE M4

ENERGIZATION MODE M5

ENERGIZATION MODE M6

WHEN INCORRECTLY IDENTIFIED AS R=R₂₁₀

ROTOR'S MAGNETIC POLE POSITION θ [deg] ⟶

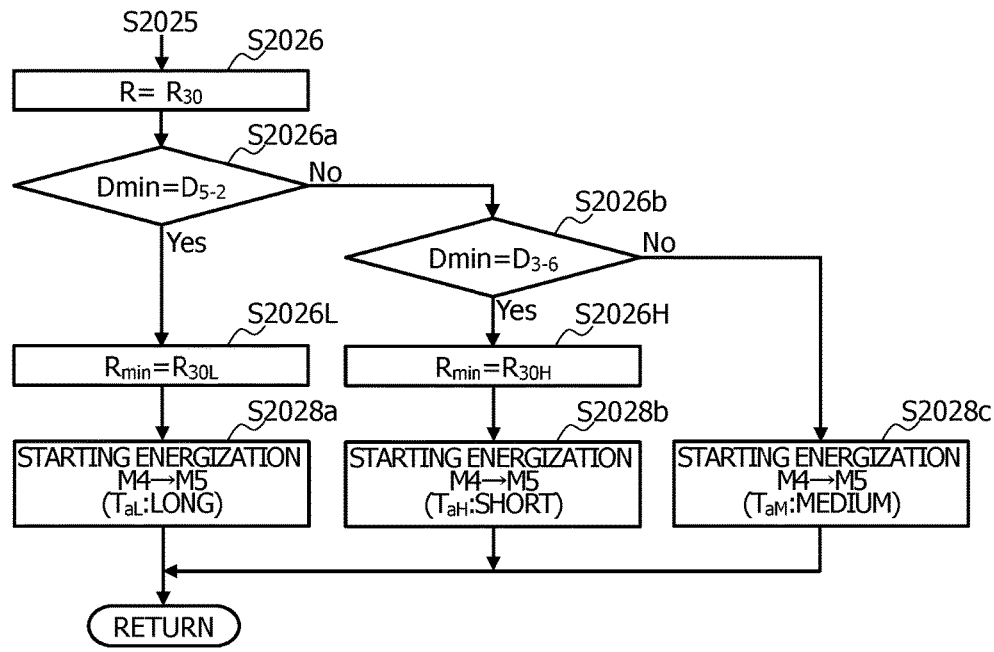
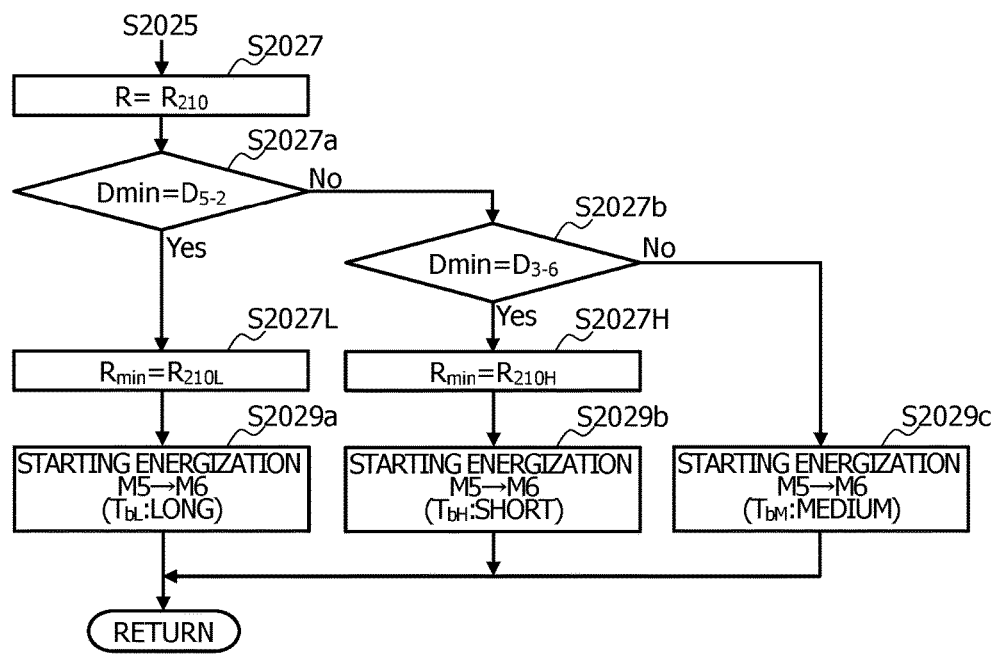

DRIVE DEVICE AND METHOD FOR THREE-PHASE BRUSHLESS MOTOR

TECHNICAL FIELD

The present invention relates to drive device and method for a three-phase brushless motor, specifically to a technique for estimating the initial position of a rotor in the three-phase brushless motor.

BACKGROUND ART

In a known drive device and method for a three-phase brushless motor, sensorless control is performed using six energization modes each for selecting two phases to be energized from the three phases of the three-phase brushless motor. Specifically, the sensorless control is performed by sequentially switching between these six energization modes based on comparison results between a reference voltage and a pulse induced voltage (induced voltage) that is generated in a non-energized phase (open-circuit phase) and that varies depending on the angular position of the rotor. In such drive device and method, the angular position (initial position) of the magnetic pole of the rotor from which the rotor that has stopped starts to rotate in a predetermined direction is estimated (see Patent Document 1, for example).

Specifically, in such drive device and method for a brushless motor, the initial position of the rotor is estimated as follows. First, the brushless motor is energized according to the six energization modes, and detects voltages each induced in a non-energized phase by energization according to the corresponding energization mode. Then, the sum and difference of the pulse induced voltages in each two energization modes that share a non-energized phase are calculated. Finally, the initial position of the rotor is estimated based on the size comparison between the three induced voltage sums calculated as above as well as on the size comparison between the three induced voltage differences calculated as above.

REFERENCE DOCUMENT LIST

Patent Document

Patent Document 1: JP 2013-223355 A

SUMMARY OF THE INVENTION

Problem to be Solved by the Invention

Here, the range of fluctuation of each induced voltage sum can be small depending on the magnetic circuit characteristics of the brushless motor. In such a case, it is difficult to provide a definitive size comparison between the three induced voltage sums. This leads to degradation in accuracy of estimating the initial position of the rotor, and thus, the brushless motor may become unable to start normally. For example, the rotor might rotate in the direction opposite to the predetermined direction at the startup of the brushless motor.

To address the above problems, the present invention has been made to provide drive device and method capable of estimating the initial position of the rotor with an improved accuracy for a three-phase brushless motor in which the range of fluctuation of each induced voltage sum is relatively small.

Means for Solving the Problem

To solve the above problems, the drive device for a three-phase brushless motor according to the present invention estimates the initial position of the rotor as follows. The difference between the pulse induced voltage in a non-energized phase detected upon energization that causes a positive current through one phase of the two energized phases of the three-phase brushless motor and the pulse induced voltage in the non-energized phase detected upon energization that causes a negative current through the one phase is calculated by setting each of the three phases to a non-energized phase. As a result, three induced voltage differences corresponding respectively to three non-energized phases are calculated. Then, after the above detection of the pulse induced voltages each generated in a non-energized phase, predetermined two phases are further energized and a change in a pulse induced voltage in the non-energized phase along with the rotation of the rotor caused by the energization is detected. The initial position of the rotor is estimated based on the three induced voltage differences and the pulse induced voltage change as described above.

In the drive method for a three-phase brushless motor according to the present invention, the initial position of the rotor is estimated as follows. The difference between the pulse induced voltage in a non-energized phase detected upon energization that causes a positive current through one phase of the two energized phases of the three-phase brushless motor and the pulse induced voltage in the non-energized phase detected upon energization that causes a negative current through the one phase is calculated by setting each of the three phases to a non-energized phase. As a result, three induced voltage differences corresponding respectively to three different non-energized phases are calculated. Then, after the above detection of the pulse induced voltages each generated in a non-energized phase, predetermined two phases are further energized and a change in a pulse induced voltage generated in a non-energized phase along with the rotation of the rotor caused by the energization is detected. The initial position of the rotor is estimated based on the three induced voltage differences corresponding respectively to the three different non-energized phases and the pulse induced voltage change in the non-energized phase along with the rotation of the rotor.

Effects of the Invention

The drive device and method for a three-phase brushless motor according to the present invention can be used for a brushless motor in which the range of fluctuation of each induced voltage sum is relatively small and can estimate the initial position of the rotor with an improved accuracy.

BRIEF DESCRIPTION OF THE DRAWINGS

FIGS. 9A to 9F illustrate pulse induced voltages generated in non-energized phases in the energization modes; and FIG. 9G illustrates the induced voltage differences.

FIG. 10A illustrates the induced voltage differences; FIG. 10B illustrates the pulse induced voltage generated in the non-energized phase in the energization mode M3.

FIG. 13A illustrates the induced voltage differences; FIG. 13B illustrates the pulse induced voltage generated in the non-energized phase in the energization mode M1.

FIG. 14A illustrates the induced voltage differences; FIG. 14B illustrates the pulse induced voltage generated in the non-energized phase in the energization mode M5.

FIGS. 21A to 21F each are a flowchart for illustrating the changes from the flowchart of FIG. 8 in the modification of the embodiment.

MODE FOR CARRYING OUT THE INVENTION

Figure 1:
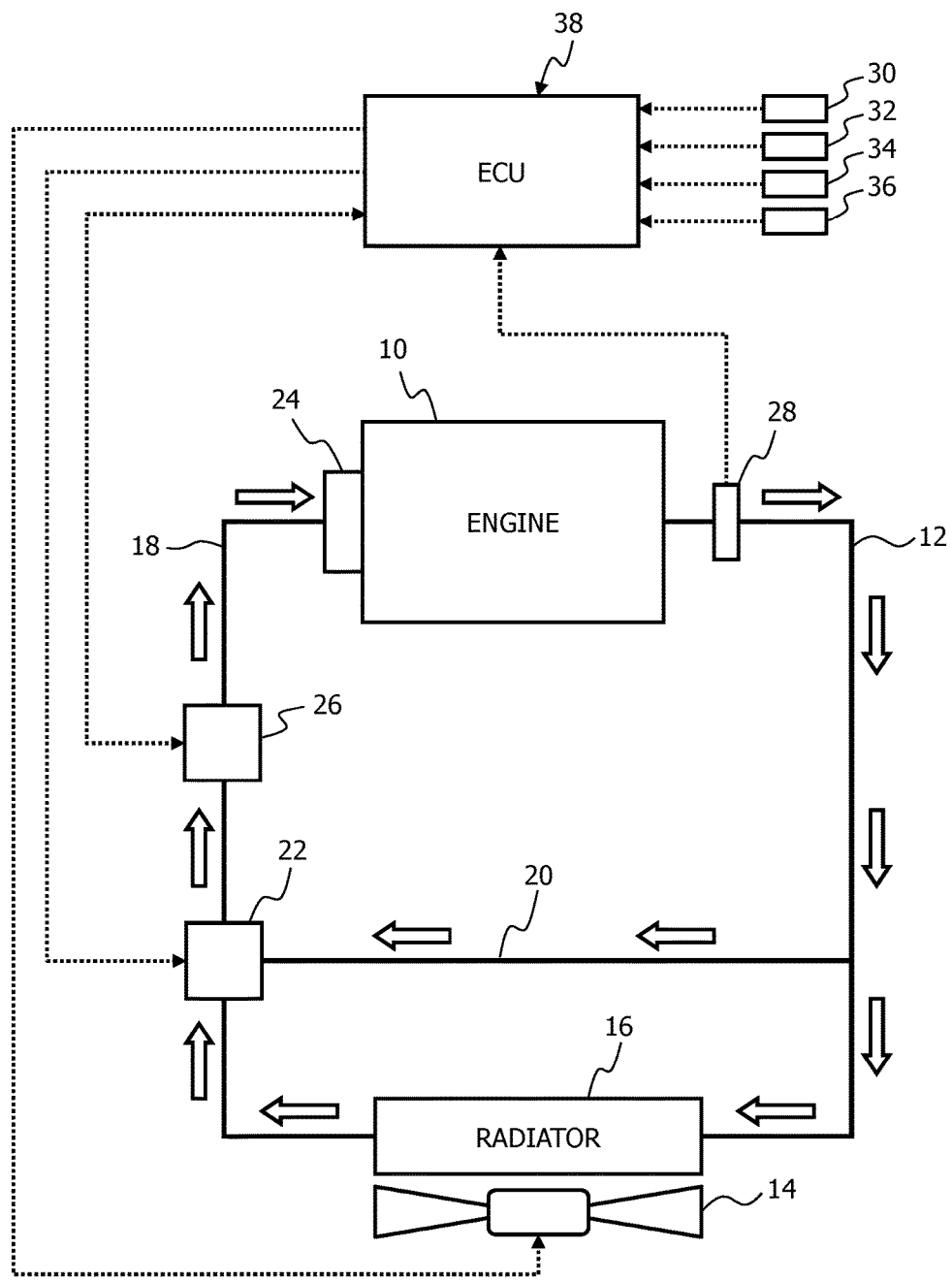
FIG. 1 illustrates a configuration of an example of an engine cooling system according to an embodiment of the present invention.

An embodiment of the present invention will be described below with reference to the accompanying drawings. FIG. 1 illustrates an example of a drive device for a three-phase brushless motor according to the present invention. Specifically, FIG. 1 illustrates a three-phase brushless motor serving as a drive source of an electrical water pump for pumping a refrigerant in an engine cooling system, and a drive device for the three-phase brushless motor.

In an engine 10 installed in a vehicle, cooling water is used as a refrigerant for cooling components, such as a cylinder block and a cylinder head. The cooling water is introduced to a radiator 16 disposed next to an electrical radiator fan 14 through a first cooling water passage 12. The cooling water flowing into radiator 16 exchanges heat with external air while passing through a radiator core provided with fins, and decreases in temperature. The cooling water reduced in temperature while passing through radiator 16 flows back to engine 10 through a second cooling water passage 18.

To allow the cooling water discharged from engine 10 to bypass radiator 16, first cooling water passage 12 is communicatively connected to second cooling water passage 18 by a bypass passage 20. At the junction between second cooling water passage 18 and the downstream end of bypass passage 20, an electrically-controlled thermostat 22 is disposed. Electrically-controlled thermostat 22 opens or closes bypass passage 20 so as to stepwise or continuously change its opening area between full open and full close. For example, electrically-controlled thermostat 22 may be an on-off valve including a heater and wax. The on-off valve is opened or closed by thermal expansion of the wax caused by the heater driven through a drive circuit in accordance with duty (duty cycle) of a pulse width modulation (PWM) signal. Thus, the ratio of the cooling water flowing through radiator 16 can be changed by controlling electrically-controlled thermostat 22 using the duty.

Between the downstream end of second cooling water passage 18 and electrically-controlled thermostat 22, a mechanical water pump 24 and an electrical water pump 26 for forcefully circulating the cooling water by way of engine 10 and radiator 16 are disposed. Mechanical water pump 24 is mounted on engine 10 so as to close its cooling water inlet, and driven by, for example, a cam shaft of engine 10. Electrical water pump 26 is driven by a brushless motor 100, which is a drive source other than engine 10 and will be described later, so as to provide cooling performance or maintain air heating functionality even while engine 10 is stopped by an idle reduction function. In this way, the power system of the vehicle is configured to drive electrical water pump 26 even during idle reduction.

The cooling system is provided with a control system for controlling the drive of radiator fan 14, electrically-controlled thermostat 22, and electrical water pump 26. The control system includes a water temperature sensor 28 which serves as a cooling water temperature detecting means for detecting the temperature (cooling water temperature) of the cooling water discharged from engine 10, a vehicle speed sensor 30 for detecting a vehicle speed, a temperature sensor 32 for detecting an external air temperature, a rotation speed sensor 34 for detecting an engine rotation speed, and a load sensor 36 for detecting an engine load. The output signals from water temperature sensor 28, vehicle speed sensor 30, temperature sensor 32, rotation speed sensor 34, and load sensor 36 are inputted to an engine control unit (hereinafter referred to as "ECU") 38 including a computer therein. In response, ECU 38 controls radiator fan 14, electrically-controlled thermostat 22, and electrical water pump 26 according to a control program stored in a read only memory (ROM) or the like in ECU 38.

In this embodiment, brushless motor 100 drives electrical water pump 26 included in the cooling system for cooling engine 10. Note, however, that the device driven by brushless motor 100 is not limited to electrical water pump 26. Alternatively, brushless motor 100 may drive an electrical oil pump included in a hydraulic pump system for automatic transmission, for example.

Figure 2:
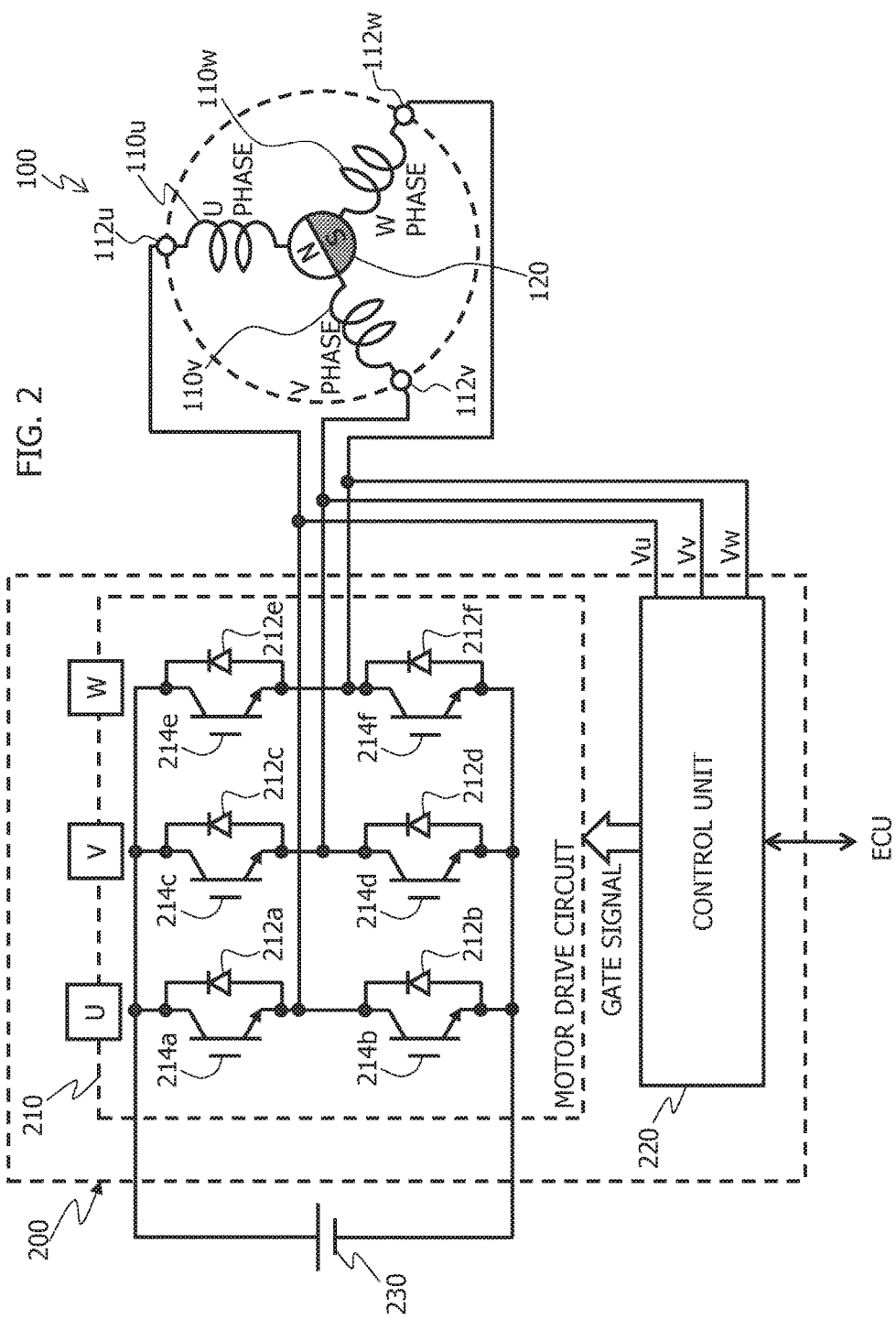
FIG. 2 is a circuit diagram illustrating an exemplar configuration of a brushless motor and a drive device therefor according to the embodiment.

FIG. 2 is a circuit diagram exemplifying brushless motor 100 for driving electrical water pump 26 and a motor control apparatus 200, which is a drive device for driving brushless motor 100. Brushless motor 100 is a three-phase direct current (DC) brushless motor including an unillustrated cylindrical stator, a rotor (permanent magnet rotor) 120, and star-connected three-phase coils, which are a U-phase coil 110$u$, a V-phase coil 110$v$, and a W-phase coil 110$w$. U-, V-, W-phase coils 110$u$, 110$v$, 110$w$ are provided in the stator. Rotor 120 is rotatably disposed in a space defined in a center portion of the stator.

Motor control apparatus 200 includes a motor drive circuit 210 and a control unit (controller) 220. Motor drive circuit 210 has a circuit including three-phase bridge-connected switching elements 214$a$ to 214$f$ and is connected to a power source 230. Switching elements 214$a$ to 214$f$ respectively include antiparallel diodes 212$a$ to 212$f$. Each of switching elements 214$a$ to 214$f$ is formed of a semiconductor element for use in power control, such as a field effect transistor (FET) or an insulated gate bipolar transistor (IGBT).

Control unit 220 communicates with ECU 38 via a controller area network (CAN) or the like. Control unit 220 has an A/D converter and a microcomputer including a central processing unit (CPU), a micro-processing unit (MPU), a microprocessor, or the like. Control unit 220 detects a terminal voltage Vu at a terminal 112$u$ of U-phase coil 110$u$, a terminal voltage Vv at a terminal 112$v$ of V-phase coil 110$v$, and a terminal voltage Vw at a terminal 112$w$ of W-phase coil 110$w$. Strictly speaking, each terminal voltage Vu, Vv, Vw is a voltage between the ground GND and the corresponding terminal 112$u$, 112$v$, 112$w$. However, in this embodiment, a voltage at a neutral point is measured, and the difference obtained by subtracting the voltage at the neutral point from the voltage between the ground GND and the terminal 112$u$, 112$v$, 112$w$ is calculated and used as the terminal voltage Vu, Vv, Vw.

Control terminals (gate terminals, for example) of switching elements 214$a$ to 214$f$ are connected to control unit 220. Control unit 220 controls a voltage applied on brushless motor 100 by outputting a control signal (gate signal) for controlling the ON and OFF of switching elements 214$a$ to 214$f$ by pulse width modulation (PWM). In PWM control, timing for turning ON or OFF each of switching elements 214$a$ to 214$f$ is determined by generating a PWM signal through comparison between a value (voltage level) of a carrier signal having a triangle wave and a value (voltage level) of an instruction signal set based on an applied voltage command value.

Control unit 220 performs sensorless drive control on brushless motor 100 without using any sensor for detecting position information on rotor 120. Specifically, control unit 220 switches between two sensorless drive methods, i.e., a sine-wave drive method and a square-wave drive method, in accordance with the motor rotation speed.

In the sine-wave drive method, control unit 220 drives brushless motor 100 by applying a sine wave voltage to each phase. In this sine-wave drive method, control unit 220 detects the position of rotor 120 based on an induced voltage (speed electromotive voltage) generated by rotation of rotor 120. Furthermore, in the interval between detections of the position of rotor 120 based on the speed electromotive voltage, control unit 220 estimates the position of rotor 120 based on the motor rotation speed. Control unit 220 calculates a three-phase output value based on the estimated position of rotor 120 and the PWM duty, and causes a three-phase alternating current to flow through the phases by controlling the direction and magnitude of the current based on differences between phase-to-phase voltages.

In the square-wave drive method, control unit 220 drives brushless motor 100 by sequentially switching between patterns (energization modes) for selecting, from the three phases, two phases to which a pulse voltage (pulse-form voltage) is to be applied, each time rotor 120 reaches one of the predetermined rotational positions. In this square-wave drive method, control unit 220 applies a pulse-form voltage to these two phases selected to be energized, and acquires angular position information on rotor 120 based on a pulse induced voltage in a non-energized phase generated by this voltage application so as to detect whether the angular position of rotor 120 corresponding to energization mode switching timing has come.

Here, as the motor rotation speed decreases, the output level of the speed electromotive voltage detected for position detection in the sine-wave drive method decreases, so that the sensitivity to the speed electromotive voltage also decreases. This leads to degradation in rotor position detection accuracy in a low rotation speed range. On the other hand, the pulse induced voltage detected for position detection in the square-wave drive method is a voltage depending on the position of rotor 120, which is induced by a change in the saturation state of the magnetic circuit depending on the position of rotor 120. Thus, the pulse induced voltage can be detected in a low rotation speed range including the motor stop state. Accordingly, the square-wave drive method allows maintaining rotor position detection accuracy even in a low rotation speed range.

In light of the above, for example, control unit 220 may perform a so-called high-speed sensorless control by controlling brushless motor 100 by the sine-wave drive method in a high rotation speed range within which rotor position information can be sufficiently accurately detected by this sine-wave drive method, i.e., in a motor rotation speed range above a preset rotation speed.

On the other hand, for example, control unit 220 may perform a so-called low-speed sensorless control by controlling brushless motor 100 by the square-wave drive method in a low rotation speed range within which rotor position information cannot be sufficiently accurately detected by the sine-wave drive method. This low rotation speed range within which position information cannot be sufficiently accurately detected by the sine-wave drive method includes a motor rotation speed range below the preset rotation speed and a rotation speed range at motor startup.

Furthermore, control unit 220 is configured to perform feedback control. For example, as the feedback control, control unit 220 calculates the duty cycle of the PWM control signal for switching elements 214a to 214f depending on the difference between actual and target rotation speeds of brushless motor 100, and adjusts the actual rotation speed toward the target rotation speed.

Figure 3:
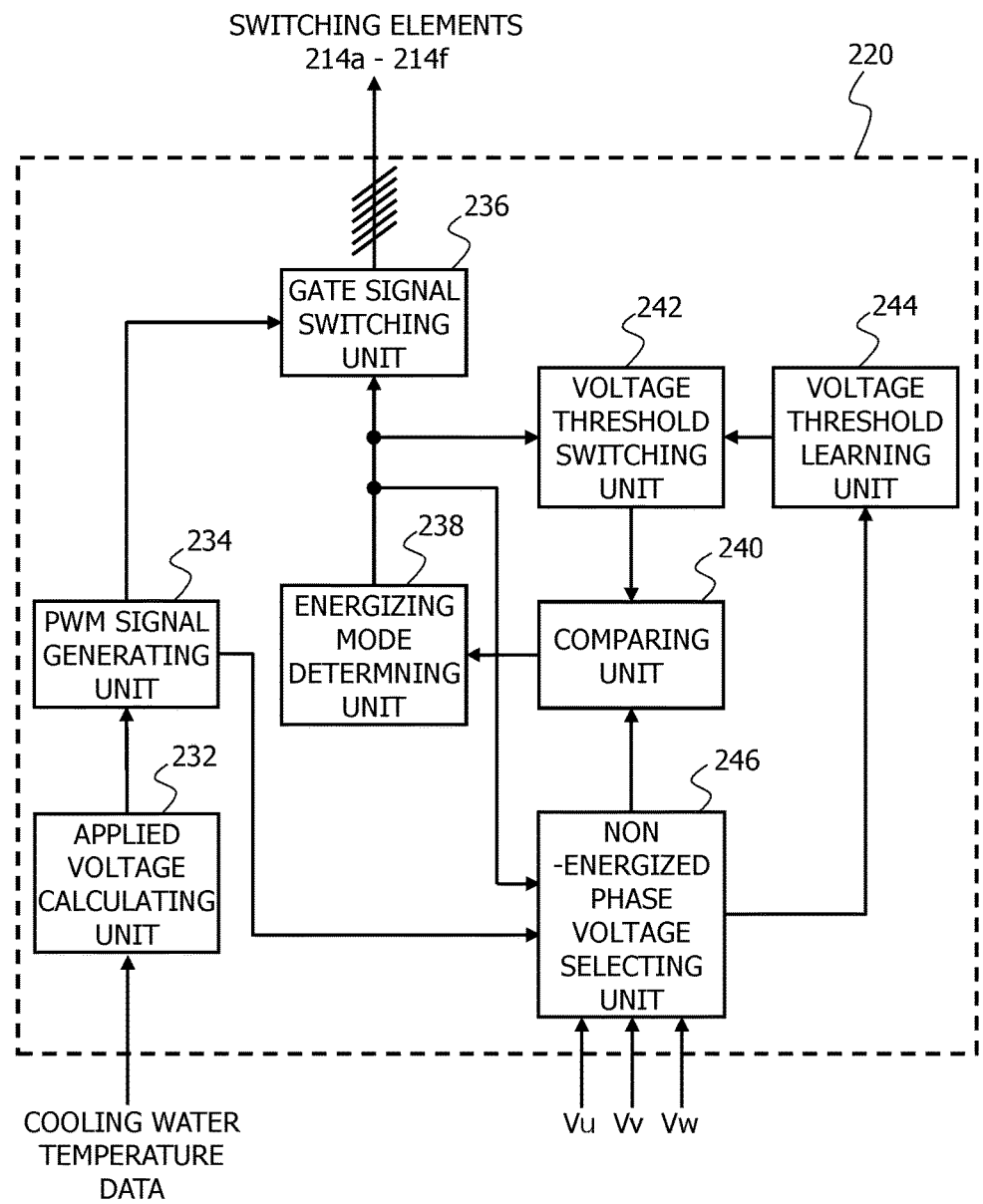
FIG. 3 is a functional block diagram of a control unit according to the embodiment.

FIG. 3 is a functional block diagram exemplifying components in control unit 220 that are related to the low-speed sensorless control according to the square wave drive method. Control unit 220 includes an applied voltage calculating unit 232, a PWM signal generating unit 234, a gate signal switching unit 236, an energization mode determining unit 238, a comparing unit 240, a voltage threshold switching unit 242, a voltage threshold learning unit 244, and a non-energized phase voltage selecting unit 246.

Applied voltage calculating unit 232 receives cooling water temperature data from ECU 38 and calculates the target rotation speed of brushless motor 100 based on the received cooling water temperature data. Then, applied voltage calculating unit 232 calculates an applied voltage command value for brushless motor 100 based on the difference between the target rotation speed thus calculated and the actual rotation speed, which is the actual speed at which brushless motor 100 rotates. PWM signal generating unit 234 calculates a duty cycle based on the applied voltage command value and generates a PWM signal having a pulse width modulated with the duty cycle. Note that control unit 220 does not have to calculate the applied voltage command value for itself. Alternatively, control unit 220 may receive the applied voltage command value calculated by ECU 38.

Triggered by a mode switching trigger signal outputted by comparing unit 240, which will be described later, energization mode determining unit 238 determines any one of energization modes M1 to M6 to be used in applying a pulse voltage on the U, V, W phases of brushless motor 100, and generates a mode command signal for directing the energization mode thus determined.

Figure 4A:
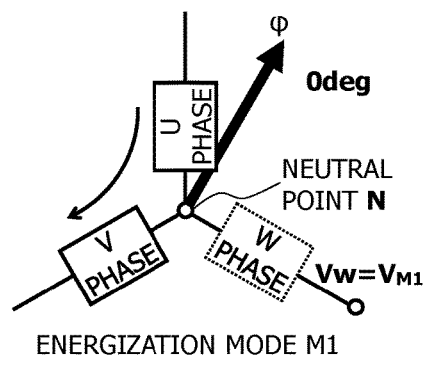
FIGS. 4A to 4F illustrate examples each depicting the directions of an electrical current and a synthetic magnetic flux as well as a pulse induced voltage generated in one of energization modes according to the embodiment.
Figure 4B:
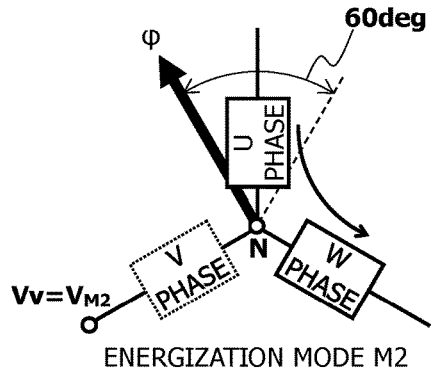
Figure 4C:
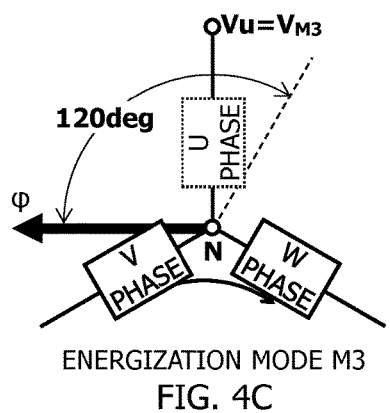
Figure 4D:
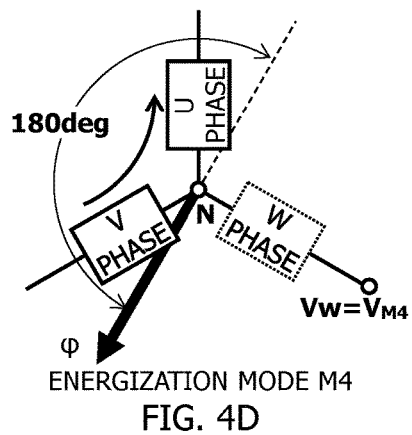
Figure 4E:
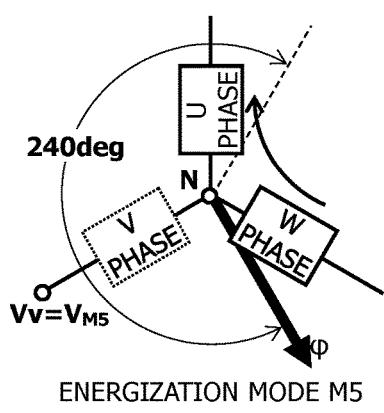
Figure 4F:
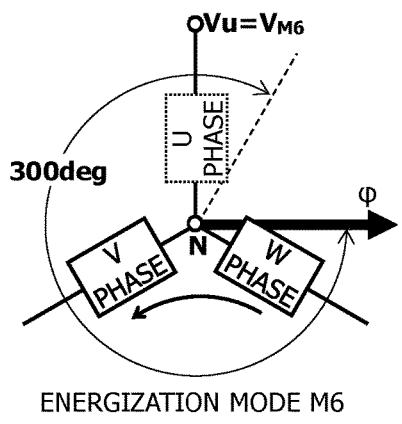

Referring to FIGS. 4A to 4F, the energization modes are patterns for selecting, from among the three phases, i.e., U, V, W phases in brushless motor 100, two phases to which a pulse voltage is applied, and include the first to sixth energization modes M1 to M6. In the first energization mode M1, a current is caused to flow sequentially through the U and V phases, as illustrated in FIG. 4A. In the second energization mode M2, a current is caused to flow sequentially through the U and W phases, as illustrated in FIG. 4B. In the third energization mode M3, a current is caused to flow sequentially through the V and W phases, as illustrated in FIG. 4C. In the fourth energization mode M4, a current is caused to flow sequentially through the V and U phases, as illustrated in FIG. 4D. In the fifth energization mode M5, a current is caused to flow sequentially through the W and U phases, as illustrated in FIG. 4E. In the sixth energization mode M6, a current is caused to flow sequentially through the W and V phases, as illustrated in FIG. 4F. As used herein, in each phase, an electrical current toward the neutral point N is referred to as a positive current, and an electrical current in the opposite direction is referred to as a negative current.

As used herein, an electrical angle around the rotor shaft indicating an estimated direction of a synthetic magnetic flux φ of magnetic fluxes excited by the three-phase coils, i.e., the U-, V-, W-phase coils 110u, 110v, 110w is referred to as an estimated angle of the synthetic magnetic flux φ.

Assume that the estimated angle of the synthetic magnetic flux φ during energization according to the energization mode M1 is 0 degrees, as illustrated in FIG. 4A. Then, as illustrated in FIGS. 4B to 4F, the estimated angle of the synthetic magnetic flux φ during energization according to the energization mode M2 is 60 degrees; the estimated angle of the synthetic magnetic flux φ during energization according to the energization mode M3 is 120 degrees: the estimated angle of the synthetic magnetic flux φ during energization according to the energization mode M4 is 180 degrees; the estimated angle of the synthetic magnetic flux φ during energization according to the energization mode M5 is 240 degrees; and the estimated angle of the synthetic magnetic flux φ during energization according to the energization mode M6 is 300 degrees.

By varying the mode command signal, energization mode determining unit 238 sequentially switches between these six energization modes M1 to M6 so as to rotate the estimated angle of the synthetic magnetic flux φ by 60 degrees upon each switching. The magnetic pole (the north pole, for example) of rotor 120 is magnetically attracted to the rotating synthetic magnetic flux φ. Thus, rotor 120 rotates in the same direction as the synthetic magnetic flux φ rotates, so that brushless motor 100 operates accordingly. As used hereinbelow, the direction in which rotor 120 rotates as energization mode determining unit 238 sequentially switches between the energization modes M1 to M6 in this order is referred to as a forward rotation direction, and the opposite direction is referred to as a reverse rotation direction.

As illustrated in FIGS. 4A to 4F, during energization according to the energization modes M1, M4, pulse induced voltages $V_{M1}$, $V_{M4}$ are respectively detected as the terminal voltage Vw at terminal 112w of the W phase, which is not energized. During energization according to the energization modes M2, M5, pulse induced voltages $V_{M2}$, $V_{M5}$ are respectively detected as the terminal voltage Vv at terminal 112v of the V phase, which is not energized. During energization according to the energization modes M3, M6, pulse induced voltages $V_{M3}$, $V_{M6}$ are respectively detected as the terminal voltage Vu at terminal 112u of the U phase, which is not energized.

Based on the mode command signal from energization mode determining unit 238 and the PWM signal generated by PWM signal generating unit 234, gate signal switching unit 236 determines the operational states to which switching elements 214a to 214f in motor drive circuit 210 are switched. According to the determination, gate signal switching unit 236 outputs six pulse-form gate signals to motor drive circuit 210.

In voltage threshold switching unit 242, a voltage threshold for detecting whether energization mode switching timing has come is preset for each of the pulse induced voltages $V_{M1}$, $V_{M2}$, $V_{M3}$, $V_{M4}$, $V_{M5}$, $V_{M6}$ which are generated by energization according to the respective energization modes M1 to M6. Voltage threshold switching unit 242 sequentially switches between these voltage thresholds in accordance with the next energization mode. The timing for switching between the thresholds is determined based on a change in the mode command signal generated by energization mode determining unit 238.

Figure 5:
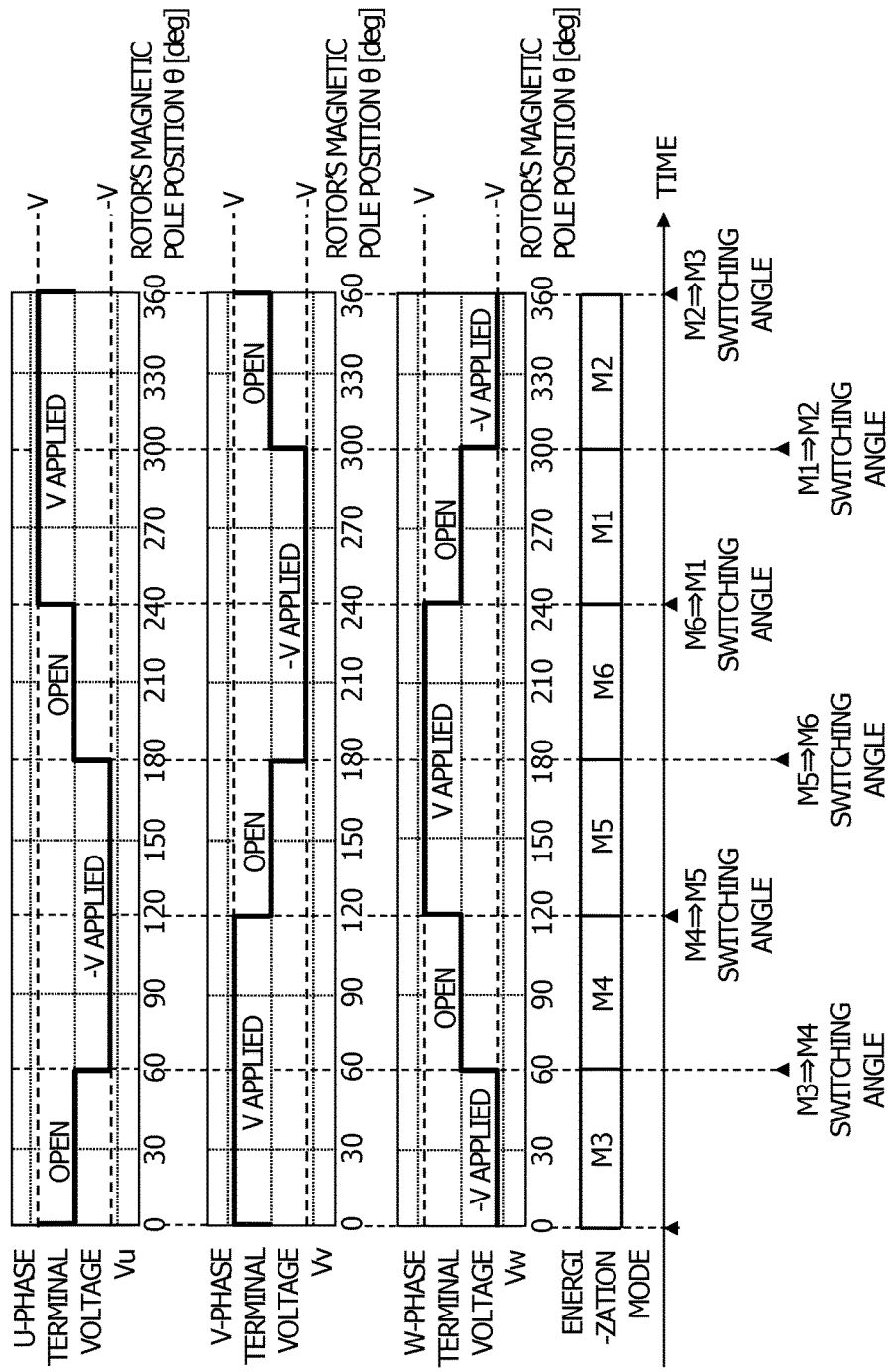
FIG. 5 is a time chart exemplifying angles at which the energization modes are switched one from another as well as the energized phases and energization direction in each energization mode, according to the embodiment.

In the square wave drive method, pulse voltages are applied to two energized phases of the three phases as illustrated in FIG. 5. Specifically, a positive pulse voltage (V) is applied as a terminal voltage to one of the two energized phases so as to generate a positive phase current, while a negative pulse voltage (−V) is applied as a terminal voltage to the other so as to generate a negative phase current. The six patterns of such pulse voltage application individually correspond to the energization modes M1 to M6. In the square wave drive method, brushless motor 100 is driven by sequentially switching between the energization modes M1 to M6 at the switching angular positions which are spaced an electrical angle of 60 degrees apart.

Thus, assume, as described above, that the estimated angle of the synthetic magnetic flux φ during energization according to the energization mode M1 is 0 degree, the voltage thresholds are as follows. The voltage threshold for switching from the energization mode M3 to the energization mode M4 is set to the pulse induced voltage $V_{M3}$ detected when the angular position of the magnetic pole (magnetic pole position) of rotor 120 is at 60 degrees. The voltage threshold for switching from the energization mode M4 to the energization mode M5 is set to the pulse induced voltage $V_{M4}$ detected when the magnetic pole position of rotor 120 is at 120 degrees. The voltage threshold for switching from the energization mode M5 to the energization mode M6 is set to the pulse induced voltage $V_{M5}$ detected when the magnetic pole position of rotor 120 is at 180 degrees. The voltage threshold for switching from the energization mode M6 to the energization mode M1 is set to the pulse induced voltage $V_{M6}$ detected when the magnetic pole position of rotor 120 is at 240 degrees. The voltage threshold for switching from the energization mode M1 to the energization mode M2 is set to the pulse induced voltage $V_{M1}$ detected when the magnetic pole position of rotor 120 is at 300 degrees.

Based on the mode command signal from energization mode determining unit 238 and the PWM signal from PWM signal generating unit 234, non-energized phase voltage selecting unit 246 detects that an upper-arm switching element of one phase and a lower-arm switching element of another phase are in the ON period among switching elements 214a to 214f. Based on the detection, non-energized phase voltage selecting unit 246 selects and receives a non-energized phase terminal voltage (i.e., pulse induced voltage) from among the detected three-phase terminal voltages Vu, Vv, Vw at terminals 112u, 112v, 112w.

By comparing the threshold set by voltage threshold switching unit 242 with the pulse induced voltage detected by non-energized phase voltage selecting unit 246, comparing unit 240 detects whether or not energization mode switching timing has come, in other words, whether or not the magnetic pole of rotor 120 has reached an angular position at which the energization modes are switched from one to another. When detecting that the switching timing has come, comparing unit 240 generates a mode switching trigger signal as a trigger for causing energization mode determining unit 238 to generate the mode command signal.

Voltage threshold learning unit 244 performs learning processing to update the voltage thresholds for determining whether or not the energization mode switching timing has come, and to store the updated voltage thresholds. Specifically, in the voltage threshold learning processing, voltage threshold learning unit 244 first detects the pulse induced voltage when the magnetic pole of rotor 120 is at any one of the predetermined angular positions at which the energization modes are switched from one to another. Then, voltage threshold learning unit 244 corrects the corresponding voltage threshold stored in voltage threshold switching unit 242 based on the detection result. Such learning processing is performed for the following reasons. The pulse induced voltage in a non-energized phase varies due to manufacturing variations of brushless motor 100 or detection variations of the voltage detecting circuit. Thus, if each voltage threshold is a fixed value, the energization mode switching timing might be erroneously determined to have come.

Figure 6:
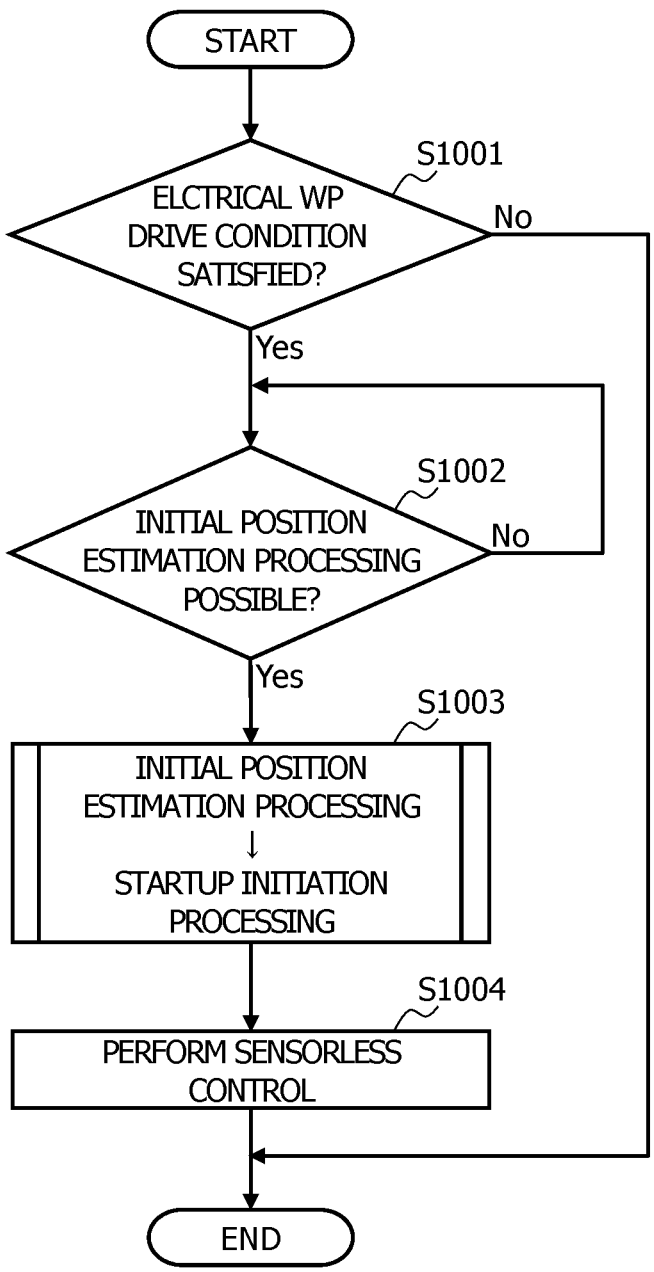
FIG. 6 is a flowchart exemplifying a main routine for drive control on the brushless motor according to the embodiment.

FIG. 6 is a flowchart illustrating a main routine for processing that control unit 220 performs for drive control on brushless motor 100 (electrical water pump 26).

In step S1001 (abbreviated as "S1001" in the flowchart; this also applies the other steps below), control unit 220 determines whether or not the conditions for driving brushless motor 100 (electrical water pump 26) are satisfied.

For example, the conditions for driving brushless motor 100 may include: the power supply voltage of brushless motor 100 is above a predetermined voltage; no error is detected in either brushless motor 100 or motor drive circuit 210 through various diagnosis steps; a power supply relay for supplying the power supply voltage to brushless motor 100 is turned ON; ECU 38 has issued a drive request for electrical water pump 26; and the water or oil temperature in engine 10 is not less than a predetermined temperature.

When control unit 220 determines that the conditions for driving brushless motor 100 are satisfied (Yes) in step S1001, the operation proceeds to step S1002. On the other hand, when control unit 220 determines that the conditions for driving brushless motor 100 are not satisfied (No), the control processing in this main routine ends.

In step S1002, control unit 220 determines whether or not the conditions for performing initial position estimation processing are satisfied. In the initial position estimation processing, control unit 220 estimates the initial position of brushless motor 100. As used herein, the initial position of rotor 120 refers to the magnetic pole position of rotor 120 that stops at the startup of brushless motor 100 or the magnetic pole position of rotor 120 at the start of the initial position estimation processing (north pole position, for example). The conditions for performing initial position estimation processing are satisfied when control unit 220 receives a drive request from ECU 38 and when rotor 120 is not inertially rotating at a speed high enough to affect the initial position estimation throughout the initial position estimation processing.

For example, the conditions for performing the initial position estimation processing may include: the rotation speed of brushless motor 100 is not higher than a predetermined speed; or an induced voltage (speed electromotive voltage) generated by rotation of rotor 120 is not higher than a predetermined voltage. This predetermined speed is set to the maximum motor rotation speed that allows an estimation error of the initial position to fall within an allowance. The predetermined speed may be set to 0 rpm, which corresponds to the stop state of rotor 120. Alternatively, the predetermined speed may be set to a speed low enough to cause sufficiently little change in the magnetic pole position over time required for the initial position estimation processing. The predetermined voltage is set to an induced voltage (speed electromotive voltage) generated at this maximum motor rotation speed.

When control unit 220 determines that the conditions for performing the initial position estimation processing are not satisfied in step S1002, control unit 220 repeats the processing in step S1002. Then, when control unit 220 determines that the conditions for performing this processing are satisfied, the operation proceeds to step S1003. Alternatively, control unit 220 may perform rotation speed reduction processing when control unit 220 determines that the conditions for performing this processing are not satisfied in step S1002. In the rotation speed reduction processing, brushless motor 100 is kept forcefully energized according to a predetermined energization mode continuously over time estimated to be long enough to reduce the rotation speed of rotor 120 below the predetermined speed. After control unit 220 performs the rotation speed reduction processing, the operation returns to step S1002, in which control unit 220 again determines whether or not the conditions for performing initial position estimation processing are satisfied.

In step S1003, control unit 220 performs the initial position estimation processing for estimating the initial position of rotor 120. In addition, control unit 220 performs startup initiation processing for smoothly initiating the startup of brushless motor 100 by the low-speed sensorless control in accordance with the initial position estimated through the initial position estimation processing. The processing in step S1003 will be described in detail later. After completing the startup initiation processing, control unit 220 shifts to the sensorless control to start brushless motor 100 in step S1004. In the sensorless control, brushless motor 100 is driven under the low-speed sensorless control according to the square wave drive method within the low rotation speed range, and driven under the high-speed sensorless control according to the sine wave drive method within the high rotation speed range.

Figure 7:
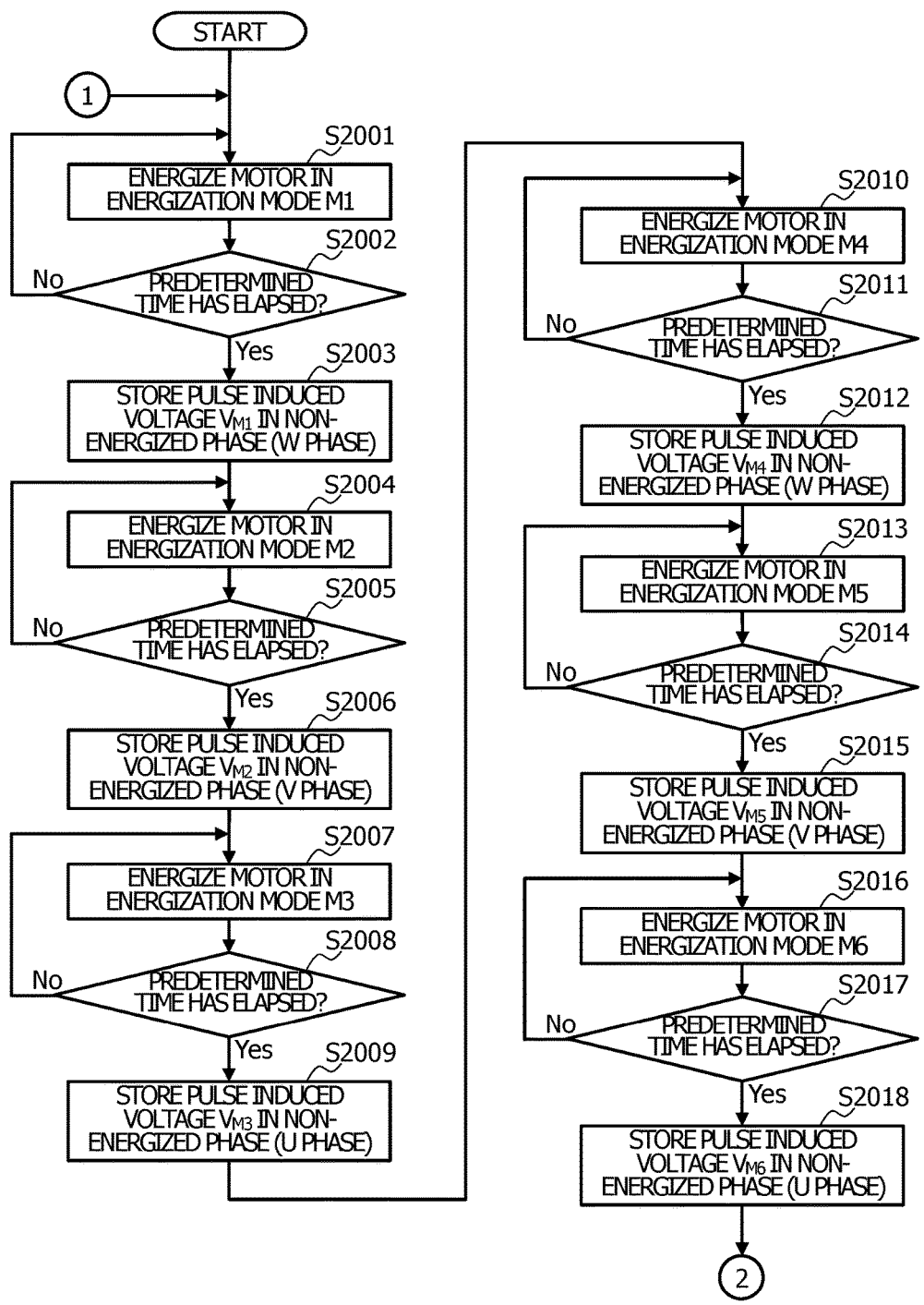
FIG. 7 is a flowchart illustrating initial position estimation and startup initiation processing according to the embodiment.
Figure 8:
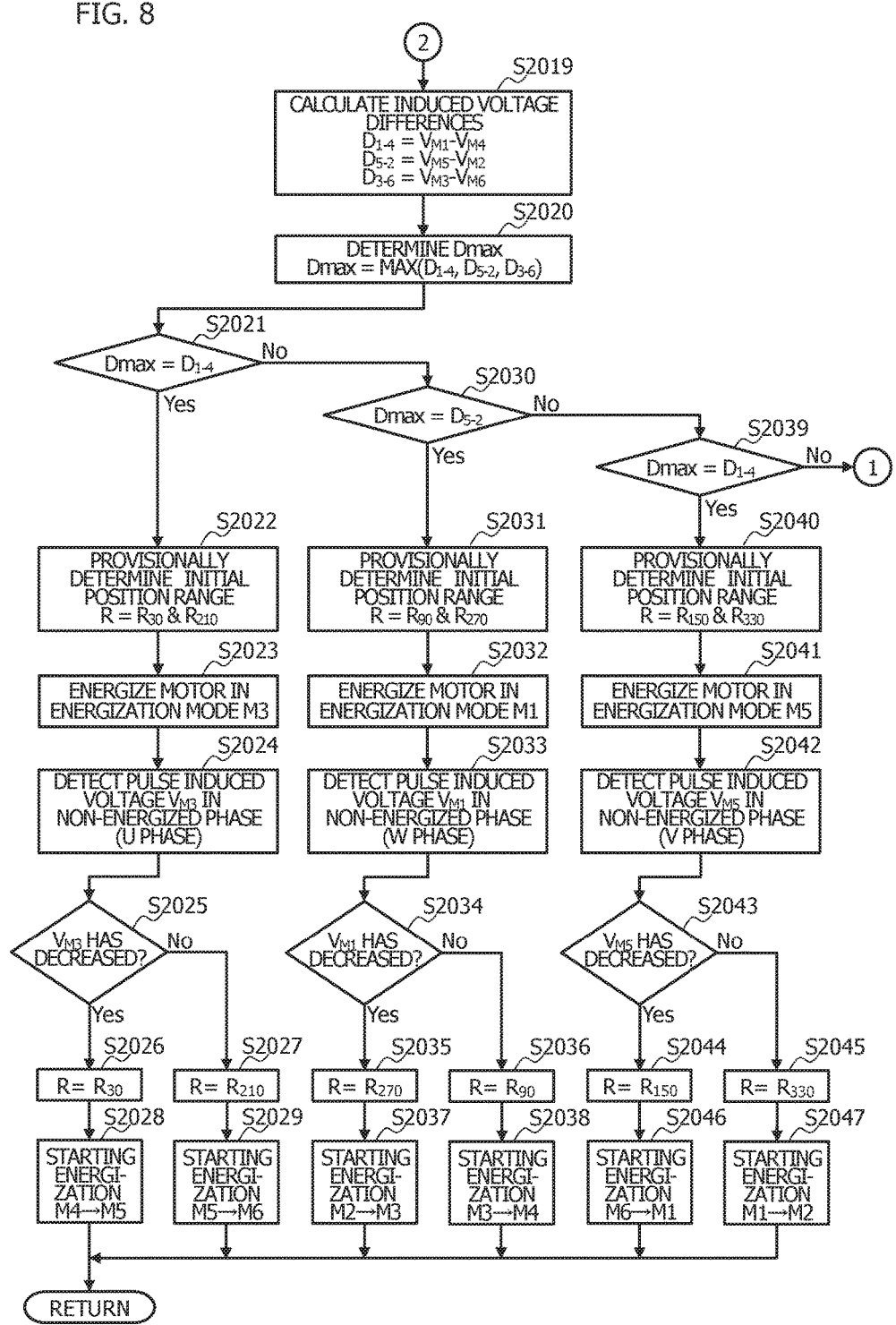
FIG. 8 illustrates a flowchart illustrating the initial position estimation and startup initiation processing according to the embodiment.
Figure 9:
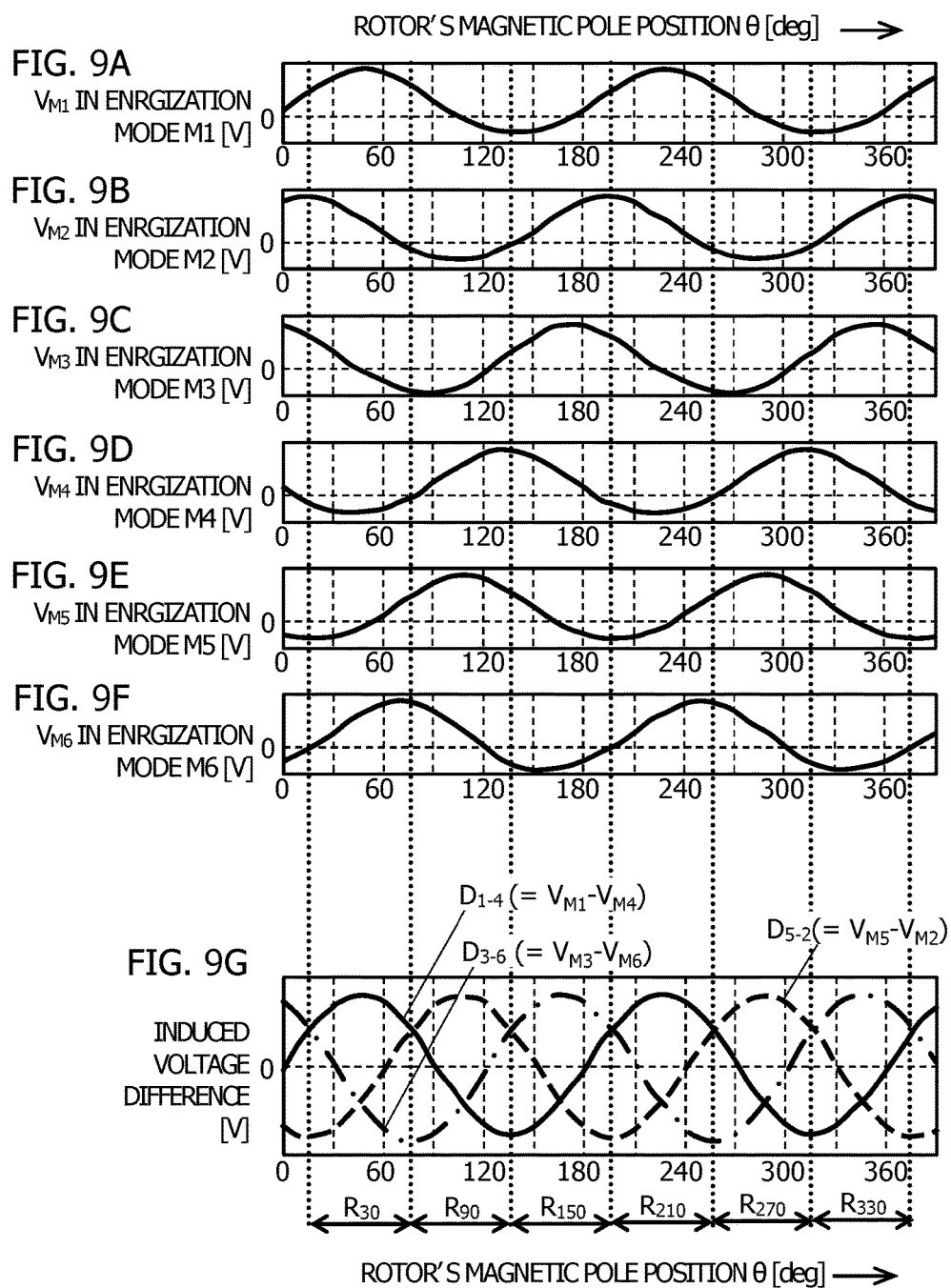
FIGS. 9A to 9G are graphs for illustrating how to calculate the induced voltage differences between pulse induced voltages generated in a non-energized phases in each energization mode according to the embodiment.

FIGS. 7, and 8 are flowcharts illustrating the detailed routine for the initial position estimation processing and startup initiation processing performed in step S1003 of the flowchart of FIG. 6. The outline of the initial position estimation processing will be described below. First, control unit 220 energizes brushless motor 100 according to each energization mode only momentarily so as substantially not to rotate rotor 120, and detects the pulse induced voltages $V_{M1}$, $V_{M2}$, $V_{M3}$, $V_{M4}$, $V_{M5}$, $V_{M6}$ generated in non-energized phases (open-circuit phases). Then, control unit 220 calculates the difference between the pulse induced voltages in each two energization modes that share a non-energized phase. In other words, the difference between the pulse induced voltage in a non-energized phase detected upon energization that causes a positive current through one phase of the two energized phases of brushless motor 100 and the pulse induced voltage in the non-energized phase detected upon energization that causes a negative current through the one phase is calculated by sequentially setting the three phases to a non-energized phase. Based on the size comparison between the resultant three pulse induced voltage differences, control unit 220 selects two angle ranges that are estimated to include the initial position of rotor 120 from among six angle ranges into which one electrical angle cycle is equally divided. After that, control unit 220 performs a predetermined control processing, which will be described later, on the selected two angle ranges so as to identify which of the two includes the initial position of rotor 120.

In step S2001, PWM signal generating unit 234 forcefully designates a duty cycle for induced voltage detection in order to detect the pulse induced voltage in a non-energized phase in the initial position estimation processing, and transmits the PWM signal having the designated duty cycle to gate signal switching unit 236. At the same time, regardless of the mode switching trigger signal from comparing unit 240, energization mode determining unit 238 transmits the mode command signal that forcefully directs the energization mode M1 to gate signal switching unit 236 so as to start energization according to the energization mode M1.

The duty cycle for induced voltage detection has a value that allows the detection of the pulse induced voltage, and that causes the rotation of rotor 120 that is only small enough not to affect the initial position estimation processing (e.g., not to affect the identification of the angle range that includes the initial position of rotor 120). The duty cycle that allows the detection of the pulse induced voltage is determined so as to secure sufficient time to establish timing for detecting each of the pulse induced voltages $V_{M1}$ to $V_{M6}$, in consideration, for example, of the duration of oscillation (ringing) of the pulse induced voltage at the initial rise of the pulse voltage applied to the energized phases as well as the time required for A/D conversion.

In the next step S2002, control unit 220 determines whether the time from the start of energization has reached a predetermined time. The predetermined time is set in consideration of the influence of current backflow occurring after energization mode switching. After the influence of the backflow has sufficiently decreased, the pulse induced voltage is detected in the next step S2003.

When control unit 220 determines that the time from the start of energization has reached the predetermined time (Yes) in step S2002, the operation proceeds to step S2003. In step S2003, non-energized phase voltage selecting unit 246 detects the pulse induced voltage $V_{M1}$ generated in the W phase, which is not energized in the energization mode M1, and stores the pulse induced voltage $V_{M1}$ in a random access memory (RAM) or the like. When control unit 220 determines that the time from the start of energization has not yet reached the predetermined time (No) in step S2002, the operation returns to step S2001.

Control unit 220 performs processing similar to that in step S2001 to S2003 also on the other energization modes M2 to M6 so as to detect the pulse induced voltages $V_{M2}$, $V_{M3}$, $V_{M4}$, $V_{M5}$, $V_{M6}$ generated in non-energized phases, and store the pulse induced voltages $V_{M2}$, $V_{M3}$, $V_{M4}$, $V_{M5}$, $V_{M6}$ in the RAM or the like. In other words, control unit 220 detects the pulse induced voltages $V_{M1}$, $V_{M2}$, $V_{M3}$, $V_{M4}$, $V_{M5}$, $V_{M6}$ generated in non-energized phases, and stores the pulse induced voltages in the RAM or the like by sequentially switching between the energization modes each time control unit 220 stores data of the pulse induced voltage generated in a non-energized phase.

In steps S2004 to S2006, control unit 220 energizes brushless motor 100 according to the energization mode M2, and detects and stores the pulse induced voltage $V_{M2}$ generated in the non-energized V phase. In steps S2007 to S2009, control unit 220 energizes brushless motor 100 according to the energization mode M3, and detects and stores the pulse induced voltage $V_{M3}$ generated in the non-energized U phase. In steps S2010 to S2012, control unit 220 energizes brushless motor 100 according to the energization mode M4, and detects and stores the pulse induced voltage $V_{M4}$ generated in the non-energized W phase. In steps S2013 to S2015, control unit 220 energizes brushless motor 100 according to the energization mode M5, and detects and stores the pulse induced voltage $V_{M5}$ generated in the non-energized V phase. In steps S2016 to S2018, control unit 220 energizes brushless motor 100 according to the energization mode M6, and detects and stores the pulse induced voltage $V_{M6}$ generated in the non-energized U phase.

As illustrated in FIG. 7, in steps S2001 to S2018, control unit 220 detects and stores the pulse induced voltage generated in the non-energized phase of each energization mode by sequentially switching between the six energization modes M1 to M6 in this order, which is the same as the mode switching order employed in the sensorless control performed after the start-up of brushless motor 100. Here, in the initial position estimation processing, it is required to minimize the rotation of rotor 120 for detecting and storing the pulse induced voltage in a non-energized phase. Thus, in order to limit the rotation of rotor 120 more reliably, control unit 220 may switch between the energization modes in an order dedicated for the induced voltage detection in the initial position estimation processing as described below.

Refer again to FIGS. 4A to 4F. The estimated angle of the synthetic magnetic flux φ is 120 degrees in the energization mode M3, in which an electrical current flows sequentially through the V and W phases. On the other hand, the estimated angle of the synthetic magnetic flux φ is 300 degrees in the energization mode M6, in which an electrical current flows sequentially through the W and V phases. Thus, when brushless motor 100 has one pole pair, the estimated angles of the synthetic magnetic flux φ in the energization modes M3, M6 are opposite each other. Similarly, the estimated angles of the synthetic magnetic flux φ in the energization modes M4, M1 are opposite each other, and the estimated angles of the synthetic magnetic flux φ in the energization modes M5, M2 are opposite each other. Furthermore, the estimated angles of the synthetic magnetic flux φ in the energization modes M6, M4 are spaced 120 degrees apart, and the estimated angles of the synthetic magnetic flux φ in the energization modes M1, M5 are spaced 120 degrees apart. The more spaced apart the estimated angles of the synthetic magnetic flux φ in two energization modes, the less the synthetic magnetic flux φ magnetically attracts rotor 120 upon switching between these two energization modes. Accordingly, control unit 220 may detect and store the pulse induced voltages in the initial position estimation processing by switching between the energization modes M3, M6, M4, M1, M5, M2 in this order, for example.

Refer now to the flowchart of FIG. 8 as well as FIGS. 9A to 9G, 10A, 10B, 11, and 12. After control unit 220 detects and stores the pulse induced voltages $V_{M1}$, $V_{M2}$, $V_{M3}$, $V_{M4}$, $V_{M5}$, $V_{M6}$ generated in the non-energized phases in the respective energization modes in steps S2001 to S2018, the operation proceeds to step S2019. In step S2019, control unit 220 calculates the difference (referred to as "induced voltage difference" below) $D_{1-4}$, $D_{5-2}$, $D_{3-6}$ between the pulse induced voltages in each two energization modes that share a non-energized phase using the following equations:

$$D_{1-4}=V_{M1}-V_{M4}$$

$$D_{5-2}=V_{M5}-V_{M2}$$

$$D_{3-6}=V_{M3}-V_{M6}$$

The pulse induced voltages $V_{M1}$, $V_{M2}$, $V_{M3}$, $V_{M4}$, $V_{M5}$, $V_{M6}$ generated in the non-energized phases upon pulse voltage application according to the energization modes change relative to the magnetic pole position of rotor 120 as illustrated in FIGS. 9A to 9F, for example. The induced voltage differences $D_{1-4}$, $D_{5-2}$, $D_{3-6}$ are calculated in the aforementioned manner from the pulse induced voltages $V_{M1}$, $V_{M2}$, $V_{M3}$, $V_{M4}$, $V_{M5}$, $V_{M6}$. In FIG. 9G, the induced voltage difference $D_{1-4}$ (solid line of FIG. 9G), the induced voltage difference $D_{5-2}$ (dashed line of FIG. 9G), and the induced voltage difference $D_{3-6}$ (dashed-dotted line of FIG. 9G) have waveforms each including two periods of sinusoidal pattern in each period and having a 120 degree phase difference from each other. Referring to FIG. 9G, within the angle range from approximately 15 to approximately 75 degrees of the magnetic pole position of rotor 120 (this angle range will be referred to as "angle range $R_{30}$" for convenience, the same applies below), the induced voltage difference $D_{1-4}$ is above the induced voltage differences $D_{5-2}$, $D_{3-6}$, thus being the largest of the three.

Similarly, within the angle range from approximately 75 to approximately 135 degrees of the magnetic pole position of rotor 120 (angle range $R_{90}$), the induced voltage difference $D_{5-2}$ is above the induced voltage differences $D_{1-4}$, $D_{3-6}$, thus being the largest of the three. Within the angle range from approximately 135 to approximately 195 degrees of the magnetic pole position of rotor 120 (angle range $R_{150}$), the induced voltage difference $D_{3-6}$ is above the induced voltage differences $D_{1-4}$, $D_{5-2}$, thus being the largest of the three. Within the angle range from approximately 195 to approximately 255 degrees of the magnetic pole position of rotor 120 (angle range $R_{210}$), the induced voltage difference $D_{1-4}$ becomes the largest again. Within the angle range from approximately 255 to approximately 315 degrees of the magnetic pole position of rotor 120 (angle range $R_{270}$), the induced voltage difference $D_{5-2}$ becomes the largest again. Within the angle range from approximately 315 to approximately 15 degrees of the magnetic pole position of rotor 120 (angle range $R_{330}$), the induced voltage difference $D_{3-6}$ becomes the largest again.

In this way, which is the largest of the induced voltage differences $D_{1-4}$, $D_{5-2}$, $D_{3-6}$ changes each approximately 60 degrees of the magnetic pole position of rotor 120 corresponding to one of the angle ranges. Thus, by determining which is the largest of the induced voltage differences $D_{1-4}$, $D_{5-2}$, $D_{3-6}$, it can be determined that, among the six angle ranges $R_{30}$, $R_{90}$, $R_{150}$, $R_{210}$, $R_{270}$, $R_{330}$, either of the corresponding two angle ranges having a 180 degree phase difference is the angle range (referred to as "initial position range" below) R that include the initial position of rotor 120.

After control unit 220 calculates the induced voltage differences $D_{1-4}$, $D_{5-2}$, $D_{3-6}$ in step S2019, the operation proceeds to step S2020. In step S2020, control unit 220 determines the maximum difference Dmax from among the induced voltage differences $D_{1-4}$, $D_{5-2}$, $D_{3-6}$.

Then, in step S2021, control unit 220 moves the operation to step S2022 when the induced voltage difference $D_{1-4}$ is the maximum difference Dmax (Yes). In step S2022, control unit 220 provisionally determines that the initial position range R is each of the two angle ranges $R_{30}$, $R_{210}$ among the six angle ranges $R_{30}$, $R_{90}$, $R_{150}$, $R_{210}$, $R_{270}$, $R_{330}$. On the other hand, in step S2021, control unit 220 moves the operation to step S2030 when the induced voltage difference $D_{1-4}$ is not the maximum difference Dmax (No).

In step S2030, control unit 220 moves the operation to step S2031 when the induced voltage difference $D_{5-2}$ is the maximum difference Dmax (Yes). In step S2031, control unit 220 provisionally determines that the initial position range R is each of the two angle ranges $R_{90}$, $R_{270}$ among the six angle ranges $R_{30}$, $R_{90}$, $R_{150}$, $R_{210}$, $R_{270}$, $R_{330}$. On the other hand, in step S2030, control unit 220 moves the operation to step S2039 when the induced voltage difference $D_{5-2}$ is not the maximum difference Dmax (No).

In step S2039, control unit 220 moves the operation to step S2040 when control unit 220 determines that the induced voltage difference $D_{3-6}$ is the maximum difference Dmax (Yes). In step S2040, control unit 220 provisionally determines that the initial position range R is each of the two angle ranges $R_{150}$, $R_{330}$ among the six angle ranges $R_{30}$, $R_{90}$, $R_{150}$, $R_{210}$, $R_{270}$, $R_{330}$. On the other hand, in step S2039, control unit 220 returns the operation to step S2001 when the induced voltage difference $D_{3-6}$ is not the maximum difference Dmax (No). "No" in step S2039 indicates that it is indeterminable which of the induced voltage differences $D_{1-4}$, $D_{5-2}$, $D_{3-6}$ is the maximum difference Dmax. Thus, the operation returns to step S2001 in order to obtain new data of the pulse induced voltages $V_{M1}$, $V_{M2}$, $V_{M3}$, $V_{M4}$, $V_{M5}$, $V_{M6}$ generated in the non-energized phases.

Alternatively, when the induced voltage difference $D_{3-6}$ is not the maximum difference Dmax in step S2039, control unit 220 may determine that the initial position estimation processing is not currently possible and perform the following processing instead of returning to the operation to step S2001. Specifically, in this alternative processing, control unit 220 first performs processing for positioning the magnetic pole position of rotor 120 within a predetermined angle range (around 120 degrees, for example) by forcefully and continuously energizing brushless motor 100 in a predetermined energization mode (energization mode M3, for example). After that, control unit 220 energizes brushless motor 100 in the next predetermined energization mode (energization mode M4 or M5, for example), and then shifts to the sensorless control in step S1004.

It might be considered that, if three induced voltage sums $S_{1+4}$ $(=V_{M1}+V_{M4})$, $S_{5+2}$ $(=V_{M5}+V_{M2})$, $S_{3+6}$ $(=V_{M3}+V_{M6})$ are calculated by adding two of the pulse induced voltages $V_{M1}$ to $V_{M6}$ in each two energization modes that share a non-energized phase, in addition to the calculation of the induced voltage differences $D_{1-4}$, $D_{5-2}$, $D_{3-6}$, the single initial position range R of rotor 120 can be uniquely identified from among the six angle ranges $R_{30}$, $R_{90}$, $R_{150}$, $R_{210}$, $R_{270}$, $R_{330}$ based on the size comparison of the three induced voltage differences $D_{1-4}$, $D_{5-2}$, $D_{3-6}$, and the size comparison of the three induced voltage sums $S_{1+4}$, $S_{5+2}$, $S_{3+6}$.

Figure 26:
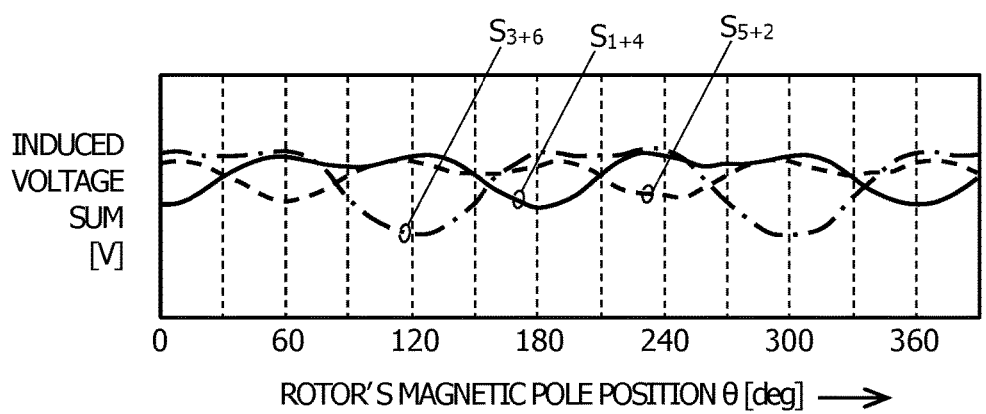
FIG. 26 illustrates the fluctuation of each induced voltage sum versus the magnetic pole position of the rotor.

However, as exemplified in FIG. 26, it is sometimes difficult to provide a definitive size comparison between the three induced voltage sums $S_{1+4}$, $S_{5+2}$, $S_{3+6}$ since the range of fluctuation of each induced voltage sum versus the magnetic pole position of rotor 120 can be small depending on the magnetic circuit characteristics of brushless motor 100. In such a case, the single initial position range R of rotor 120 cannot be successfully uniquely identified from among the six angle ranges $R_{30}$, $R_{90}$, $R_{150}$, $R_{210}$, $R_{270}$, $R_{330}$. This reduces the estimation accuracy of the initial position of rotor 120. As a result, brushless motor 100 may become unable to start normally. For example, rotor 120 might rotate in the reverse rotation direction at the startup of brushless motor 100.

For the above reason, the initial position range R is identified as follows in this embodiment without calculating the three induced voltage sums $S_{1+4}$, $S_{5+2}$, $S_{3+6}$. Specifically, by the aforementioned method, based on which is the largest of the three induced voltage differences $D_{1-4}$, $D_{5-2}$, $D_{3-6}$ each between two energization modes that share a non-energized phase, it is provisionally determined that the initial position range R is each of the corresponding two angle ranges among the six angle ranges $R_{30}$, $R_{90}$, $R_{150}$, $R_{210}$, $R_{270}$, $R_{330}$. Then, the initial position range R is finally identified from among these two angle ranges based on a change in the pulse induced voltage generated in a non-energized phase by energizing brushless motor 100 according to a predetermined energization mode.

Figure 10:
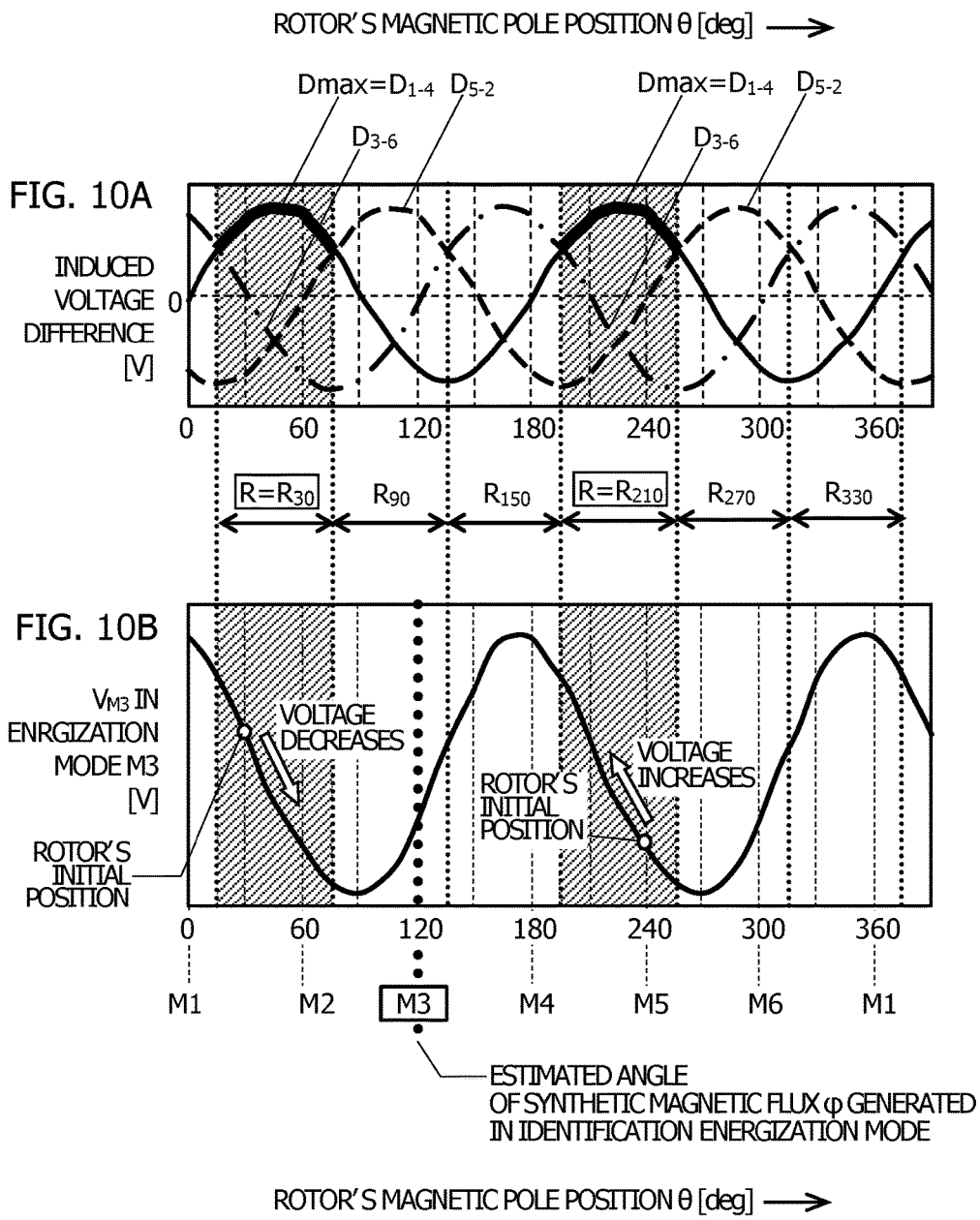
FIGS. 10A and 10B are graphs for illustrating how to identify the initial position range according to the embodiment.

FIGS. 10A and 10B illustrate how control unit 220 identifies the initial position range R. As illustrated in FIG. 10A, when the induced voltage difference $D_{1-4}$ is the maximum difference Dmax, control unit 220 provisionally determines that the initial position range R is each of the two angle ranges $R_{30}$, $R_{210}$. In this case, control unit 220 energizes brushless motor 100 according to the energization mode M3, set as an identification energization mode (predetermined energization mode) for identifying the initial position range R. In response, the synthetic magnetic flux φ is generated at an estimated angle of 120 degrees between the angle ranges $R_{30}$, $R_{210}$ (see FIG. 4C), and the magnetic pole of rotor 120 starts to rotate from the initial position by the attraction of the synthetic magnetic flux φ at the estimated angle of 120 degrees.

Here, as illustrated in FIG. 10B, it has been known that the pulse induced voltage $V_{M3}$ changes in the following manner upon energization according to the energization mode M3 set as the identification energization mode. When the initial position range R of rotor 120 is the angle range $R_{30}$, the pulse induced voltage $V_{M3}$ generated in the non-energized phase monotonically decreases as rotor 120 rotates in the forward rotation direction. On the other hand, when the initial position range R of rotor 120 is the angle range $R_{210}$, the pulse induced voltage $V_{M3}$ generated in the non-energized phase monotonically increases as rotor 120 rotates in the reverse rotation direction. Accordingly, if the detected value of the pulse induced voltage $V_{M3}$ decreases upon energization according to the energization mode M3 set as the identification energization mode, the angle range $R_{30}$ can be identified as the initial position range R of rotor 120 from among the two angle ranges $R_{30}$, $R_{210}$. On the other hand, if the detected value of the pulse induced voltage $V_{M3}$ increases upon energization according to the energization mode M3, the angle range $R_{210}$ can be identified as the initial position range R of rotor 120 from among the two angle ranges $R_{30}$, $R_{210}$. In this way, it is possible to finally identify the initial position range R.

After control unit 220 provisionally determines that the initial position range R is each of the two angle ranges $R_{30}$, $R_{210}$ in step S2022, control unit 220 energizes brushless motor 100 according to the energization mode M3 for a predetermined time t in the next step S2023. Thereby, control unit 220 generates the synthetic magnetic flux φ at an estimated angle of 120 degrees between these provisionally determined angle ranges $R_{30}$, $R_{210}$, and finally identifies the initial position range R from these two angle ranges $R_{30}$, $R_{210}$.

For example, control unit 220 energizes brushless motor 100 according to the energization mode M3 set as the identification energization mode by the following method. Referring to in FIG. 3, PWM signal generating unit 234 generates a PWM signal that is forcefully set to have a duty cycle for energization according to an identification energization mode (referred to "identification energization duty cycle" below) and keeps transmitting the PWM signal to gate signal switching unit 236 for the predetermined time t. At the same time, regardless of the mode switching trigger signal from comparing unit 240, energization mode determining unit 238 keeps transmitting, to gate signal switching unit 236 for the predetermined time t, the mode command signal that forcefully directs the energization mode M3.

The identification energization duty cycle has a value (fixed value) that causes only slow rotation of the magnetic pole of rotor 120 toward 120 degrees, i.e., toward the estimated angle of the synthetic magnetic flux φ generated upon energization according to the identification energization mode such that no loss of synchronism occurs in brushless motor 100 during the low-speed sensorless control performed after completion of the initial position estimation processing and the startup initiation processing, and that allows the detection of the pulse induced voltage $V_{M3}$ in consideration, for example, of the duration of oscillation (ringing) of the pulse induced voltage $V_{M3}$ at the initial rise of the pulse voltage applied to the energized phases as well as the time required for A/D conversion.

The predetermined time t is set in accordance with the identification energization duty cycle thus designated. Specifically, the predetermined time t has a length that allows energization according to the identification energization mode to cause only small rotation of the magnetic pole of rotor 120 toward 120 degrees, i.e., toward the estimated angle of the synthetic magnetic flux φ such that no loss of synchronism occurs in brushless motor 100 during the low-speed sensorless control performed after completion of the initial position estimation processing and the startup initiation processing. For example, the predetermined time t may be set such that rotor 120 does not rotate beyond an angle range within which the pulse induced voltage $V_{M3}$ monotonically increases when rotor 120 is rotated in the forward rotation direction in order to identify which of the two angle ranges $R_{30}$, $R_{210}$ is the initial position range R, and decreases when rotor 120 is rotated in the reverse rotation direction for such identification.

Depending on the state of electric water pump 26 and the state of the cooling water of the cooling system or the like, the fixed identification energization duty cycle might be too low to provide a sufficient rotation torque for rotating rotor 120. In such a case, the pulse induced voltage $V_{M3}$ does not change. Thus, setting the identification energization duty cycle to a fixed value poses a risk of failing to finally identify the initial position range R from among these two angle ranges $R_{30}$, $R_{210}$.

Figure 11:
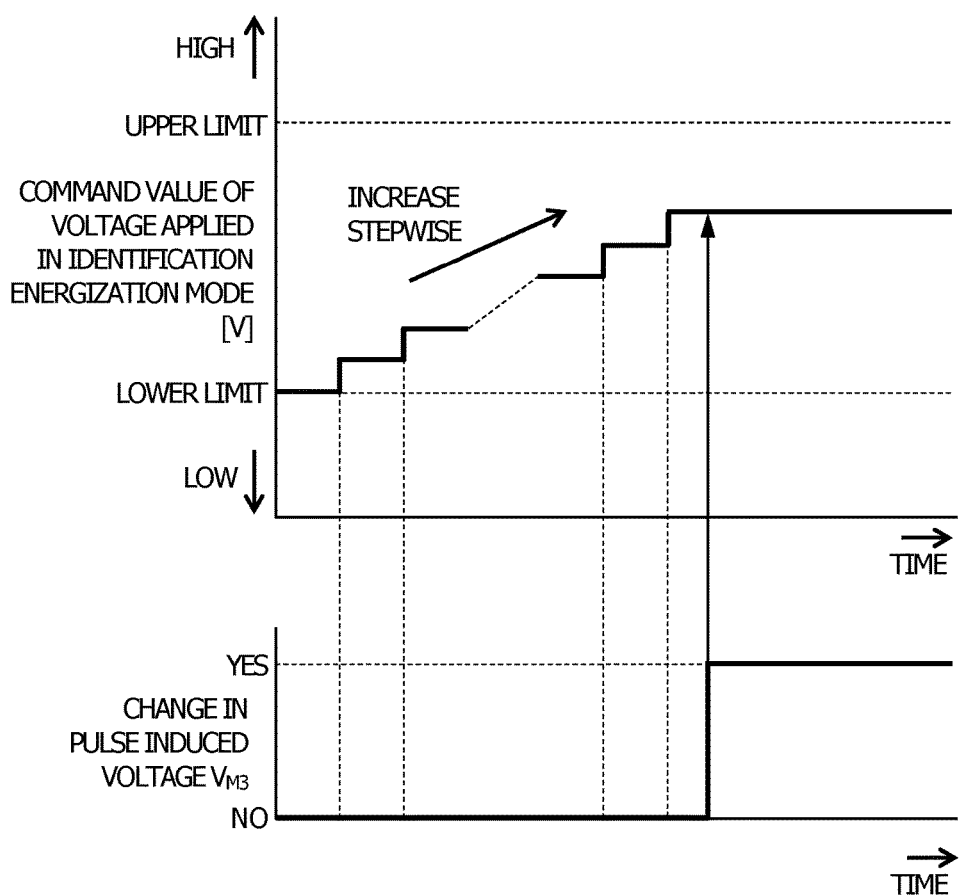
FIG. 11 illustrates energization according to an identification energization mode according to the embodiment.

Therefore, as illustrated in FIG. 11, applied voltage calculating unit 232 may forcefully and stepwise increase the applied voltage command value in the identification energization mode from a lower limit value such that PWM signal generating unit 234 can stepwise increase the identification energization duty cycle. The lower limit value corresponds to a minimum applied voltage that can cause the rotation of rotor 120 under conditions in which the load on brushless motor 100 is minimized such as when the cooling water temperature is high in the cooling system. The identification energization duty cycle calculated so as to correspond to the lower limit value in the identification energization mode may be set as the minimum duty cycle that allows the detection of a change of the pulse induced voltage $V_{M3}$.

When a change occurs in the pulse induced voltage $V_{M3}$ while applied voltage calculating unit 232 forcefully and stepwise increases the applied voltage command value in the identification energization mode from the lower limit value such that PWM signal generating unit 234 stepwise increases the identification energization duty cycle, it is determined that rotor 120 rotates in response to the applied voltage command value. Thus, control unit 220 maintains the applied voltage command value (or the identification energization duty cycle) at that timing.

Figure 12:
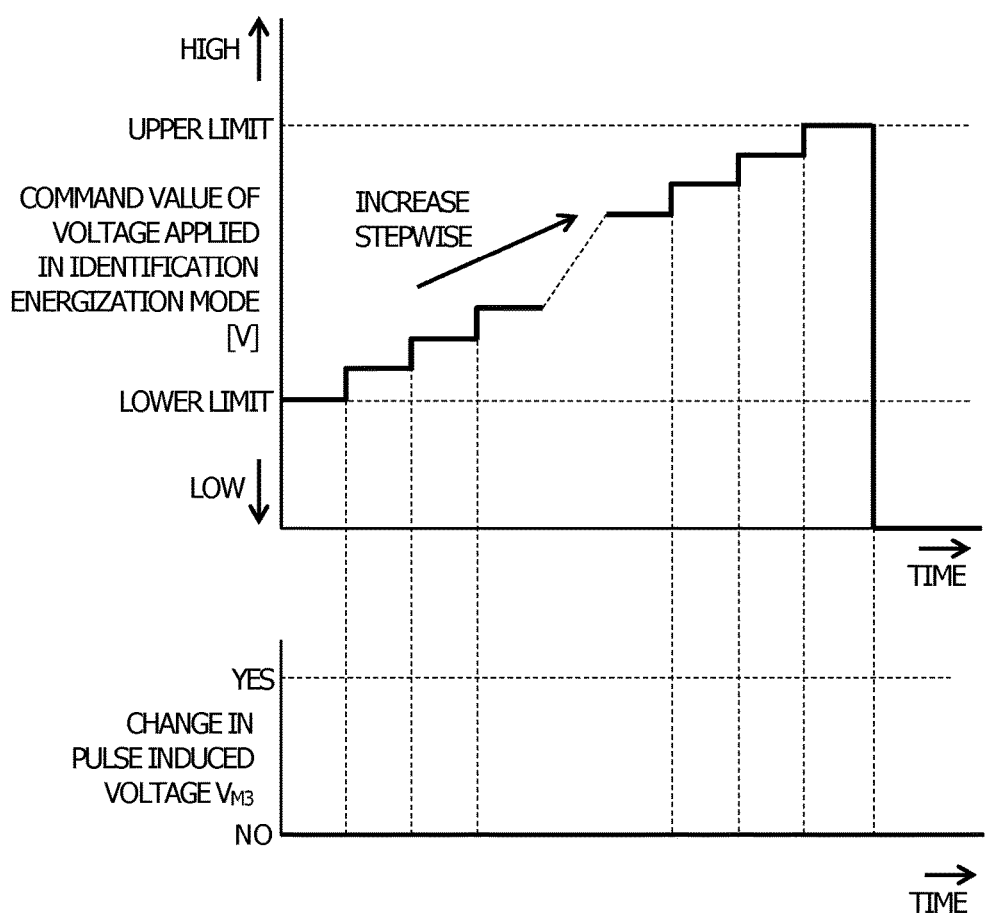
FIG. 12 illustrates energization according to the identification energization mode according to the embodiment.

On the other hand, as illustrated in FIG. 12, when no change occurs in the pulse induced voltage $V_{M3}$ even while applied voltage calculating unit 232 forcefully and stepwise increases the applied voltage command value in the identification energization mode from the lower limit value to an upper limit value, the command value is reduced to below the lower limit value (0[V], for example). The upper limit value is the value for limiting energization to brushless motor 100 for purposes such as thermally protecting brushless motor 100 in cases such as when electrical water pump 26 bites foreign objects or when the cooling water in the cooling system freezes.

Based either on a single occurrence or on consecutive occurrences of the phenomenon that no change occurs in the pulse induced voltage $V_{M3}$ even while applied voltage calculating unit 232 stepwise increases the applied voltage command value in the identification energization mode from the lower limit value to the upper limit value, control unit 220 may determine that the estimation of the initial position of rotor 120 is not currently possible and stop the startup of brushless motor 100. Instead of stepwise increases the applied voltage command value, applied voltage calculating unit 232 may gradually (continuously) increases the applied voltage command value until a change occurs in the pulse induced voltage $V_{M3}$.

After control unit 220 energizes brushless motor 100 according to the energization mode M3 set as the identification energization mode in step S2023, control unit 220 performs a plurality of detections of the pulse induced voltage $V_{M3}$ generated in the non-energized U phase in the next step S2024 after the lapse of the predetermined time set in consideration of the influence of current backflow occurring after energization mode switching (see step S2002).

In step S2025, control unit 220 determines whether or not the pulse induced voltage $V_{M3}$ has decreased based on the comparison between the detected values of the pulse induced voltage $V_{M3}$. When control unit 220 determines that the pulse induced voltage $V_{M3}$ has decreased (Yes), the operation proceeds to step S2026, in which control unit 220 identifies the angle range $R_{30}$ as the initial position range R (R=$R_{30}$). On the other hand, when control unit 220 determines that the pulse induced voltage $V_{M3}$ has increased (No) in step S2025, the operation proceeds to step S2027, in which control unit 220 identifies the angle range $R_{210}$ as the initial position range R (R=$R_{210}$). In this way, control unit 220 estimates that the initial position of rotor 120 is included either in the angle range $R_{30}$ or $R_{210}$ identified as the initial position range R, and the initial position estimation processing ends.

Figure 13:
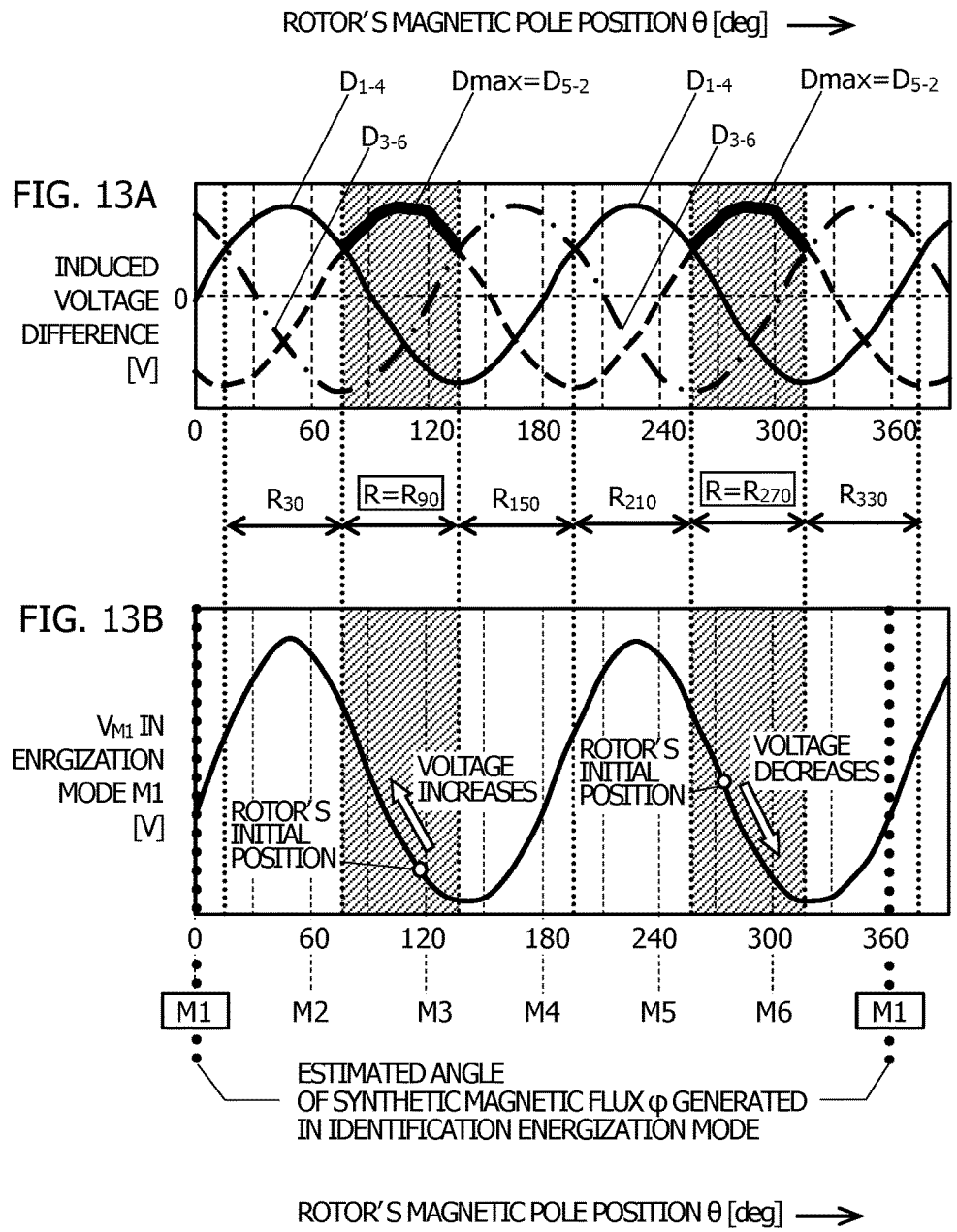
FIGS. 13A and 13B are graphs for illustrating how to identify the initial position range according to the embodiment.

Refer now to the flowchart of FIG. 8 as well as FIGS. 13A and 13B. When the induced voltage difference $D_{5-2}$ is the maximum difference Dmax in step S2030, control unit 220 performs processing as in steps S2022 to S2027 described above. Control unit 220 provisionally determines that the initial position range R is each of the two angle ranges $R_{90}$, $R_{270}$ in step S2031. In the next step S2032, control unit 220 energizes brushless motor 100 according to the energization mode M1, set as the identification energization mode, so as to generate the synthetic magnetic flux φ at an estimated angle of 360 degrees (or 0 degree) between the angle ranges $R_{90}$, $R_{270}$ and thereby rotate rotor 120. Then, in step S2034, control unit 220 determines whether or not the pulse induced voltage $V_{M1}$ has decreased based on the pulse induced voltage $V_{M1}$ detected in step S2033. When control unit 220 determines that the pulse induced voltage $V_{M1}$ has decreased, control unit 220 identifies the angle range $R_{270}$ as the initial position range R (R=$R_{270}$) in step S2035. On the other hand, when control unit 220 determines that the pulse induced voltage $V_{M1}$ has increased, control unit 220 identifies the angle range $R_{90}$ as the initial position range R (R=$R_{90}$) in step S2036. In this way, control unit 220 estimates that the initial position of rotor 120 is included either in the angle range $R_{270}$ or $R_{90}$ identified as the initial position range R, and the initial position estimation processing ends.

Figure 14:
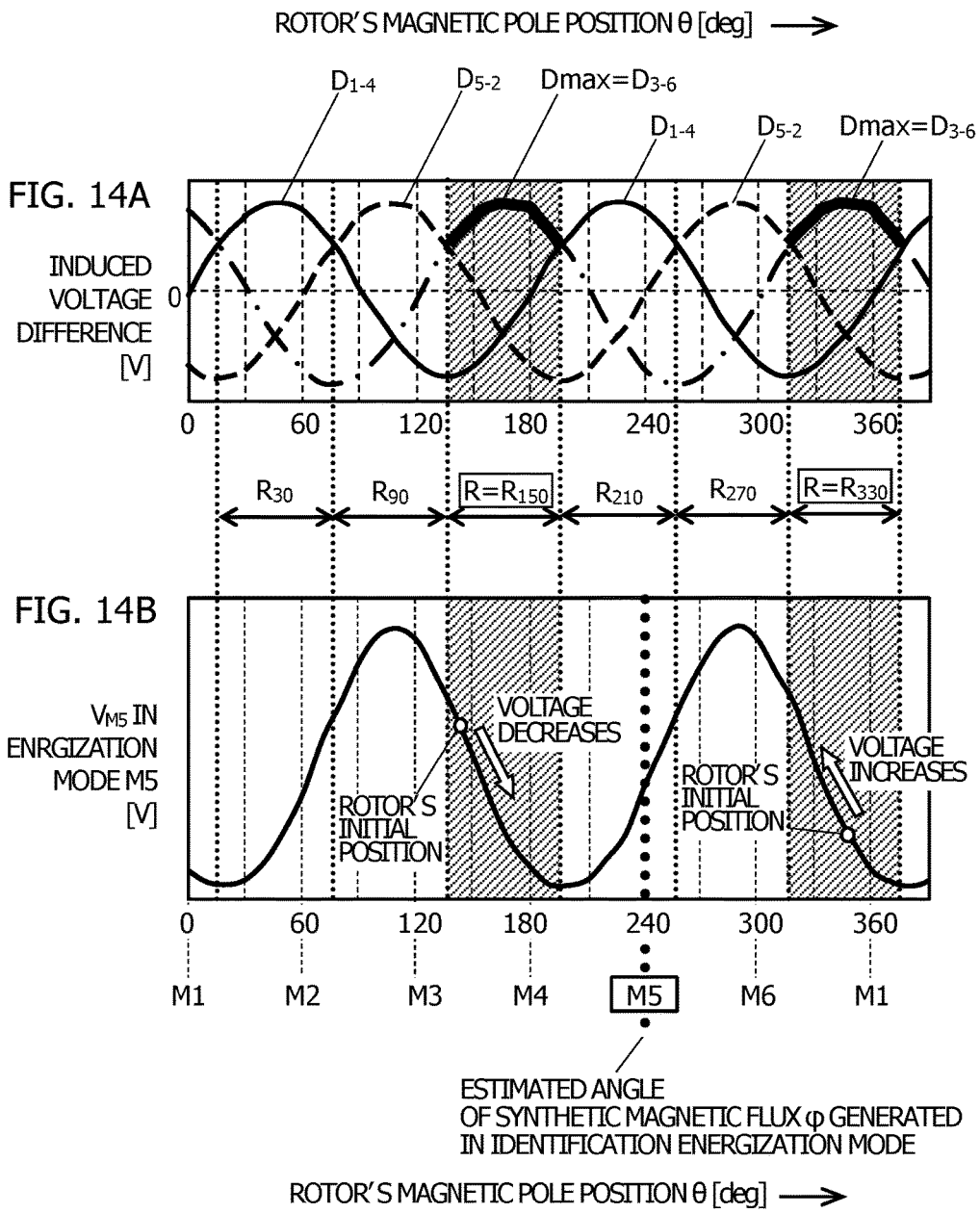
FIGS. 14A and 14B are graphs for illustrating how to identify the initial position range according to the embodiment.

Refer now to the flowchart of FIG. 8 as well as FIGS. 14A and 14B. When the induced voltage difference $D_{3-6}$ is the maximum difference Dmax in step S2039, control unit 220 performs processing as in steps S2022 to S2027 described above. Control unit 220 provisionally determines that the initial position range R is each of the two angle ranges $R_{150}$, $R_{330}$ in step S2040. In the next step S2041, control unit 220 energizes brushless motor 100 according to the energization mode M5, set as the identification energization mode, so as to generate the synthetic magnetic flux φ at an estimated angle of 240 degrees between the angle ranges $R_{150}$, $R_{300}$ and thereby rotate rotor 120. Then, in step S2043, control unit 220 determines whether or not the pulse induced voltage $V_{M5}$ has decreased based on the pulse induced voltage $V_{M5}$ detected in step S2042. When control unit 220 determines that the pulse induced voltage $V_{M5}$ has decreased, control unit 220 identifies the angle range $R_{150}$ as the initial position range R (R=$R_{150}$) in step S2044. On the other hand, when control unit 220 determines that the pulse induced voltage $V_{M5}$ has increased, control unit 220 identifies the angle range $R_{330}$ as the initial position range R (R=$R_{330}$) in step S2045. In this way, control unit 220 estimates that the initial position of rotor 120 is included either in the angle range $R_{150}$ or $R_{330}$ identified as the initial position range R, and the initial position estimation processing ends.

After the initial position estimation processing is completed, control unit 220 performs the startup initiation processing for smoothly initiating the startup of brushless motor 100 by the low-speed sensorless control. In the startup initiation processing, control unit 220 determines one of the energization modes based on the initial position range R that is estimated to include the initial position of rotor 120 through the initial position estimation processing, and forcefully energizes brushless motor 100 in this energization mode for a predetermined time T.

The reason why the startup initiation processing is performed is as follows. Upon completion of the initial position estimation processing, the magnetic pole position of rotor 120 may be beyond the angular position for switching to the next energization mode. Thus, when control unit 220 shifts to the low-speed sensorless control according to the square wave drive method immediately after having completed the initial position estimation processing, energization mode determining unit 238 cannot receive, from comparing unit 240, the mode switching trigger signal for notifying that the energization mode switching timing has come. As a result, energization mode determining unit 238 fails to switch between the energization modes in accordance with the magnetic pole position of rotor 120. This causes loss of synchronism in brushless motor 100 such as rotating rotor 120 in the reverse rotation direction.

Figure 15:
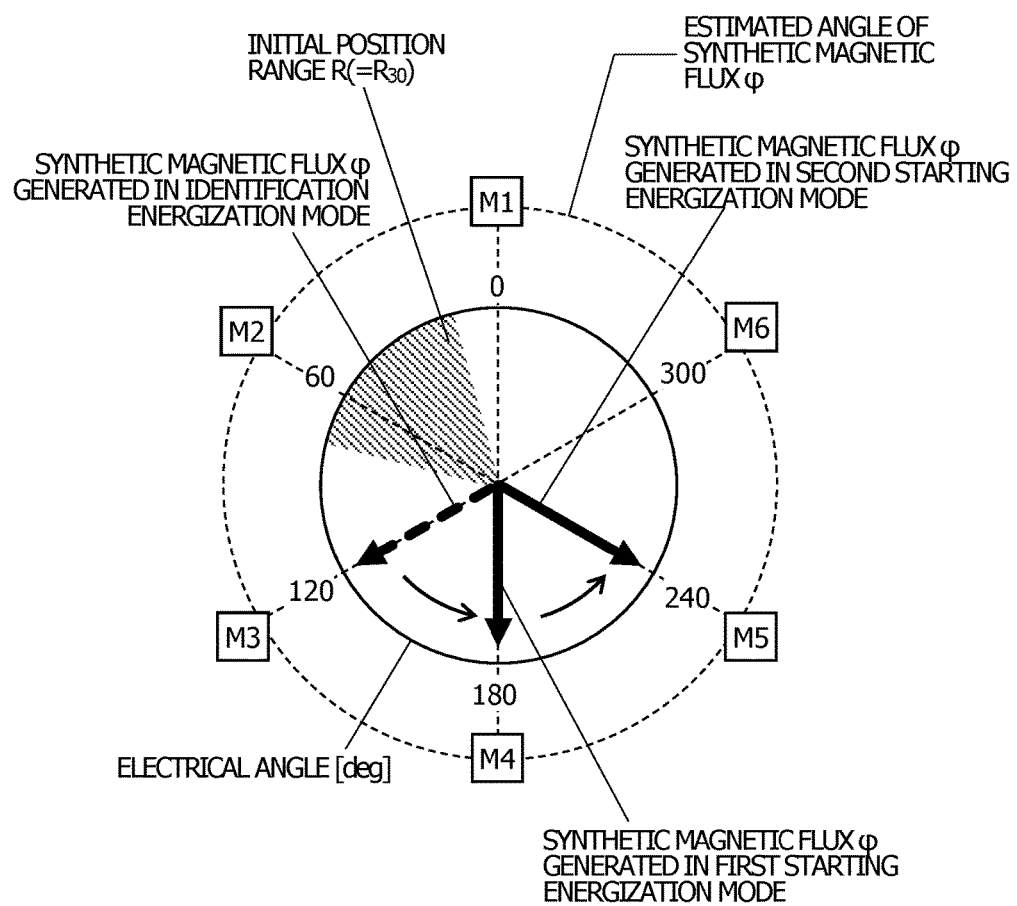
FIG. 15 illustrates energization according to the starting energization mode according to the embodiment.

This will be specifically described with reference to FIG. 15. When control unit 220 identifies the angle range $R_{30}$ as the initial position range R in step S2026, control unit 220 has energized brushless motor 100 according to the energization mode M3 set as the identification energization mode. Thus, when the low-speed sensorless control according to the square wave drive method is performed after the initial position estimation processing, control unit 220 normally switches the energization mode M3 to the next energization mode M4 so as to change the estimated angle of the synthetic magnetic flux φ from 120 degrees to 180 degrees and thereby rotate rotor 120 in the forward rotation direction. Here, in the low-speed sensorless control according to the square wave drive method, the energization mode M3 is switched to the energization mode M4 at the timing when the magnetic pole position of rotor 120 becomes 60 degrees as illustrated in FIG. 5. However, immediately after the completion of the initial position estimation processing, the magnetic pole position of rotor 120 may be beyond 60 degrees due to, for example, the rotation of rotor 120 caused by energization according to the energization mode M3 set as the identification energization mode. Thus, immediately after the completion of the initial position estimation processing, it may be impossible to switch from the energization mode M3 to the energization mode M4 in the low-speed sensorless control according to the square wave drive method. Furthermore, if, instead of this, brushless motor 100 is energized according to the energization mode M5 after the initial position estimation processing, rotor 120 may rotate in the reverse rotation direction depending on the actual initial position of rotor 120 within the initial position range R.

Thus, when control unit 220 identifies the angle range $R_{30}$ as the initial position range R (see step S2026), control unit 220 sets, in step S2028, the first energization mode used after the initial position estimation processing (referred to as "first starting energization mode" below) to the energization mode M4, which is next to the energization mode M3 set as the identification energization mode. Thereby, regardless of the magnetic pole position of rotor 120, control unit 220 forcefully energizes brushless motor 100 according to the energization mode M4 set as the first starting energization mode for the predetermined time T.

Figure 16A:
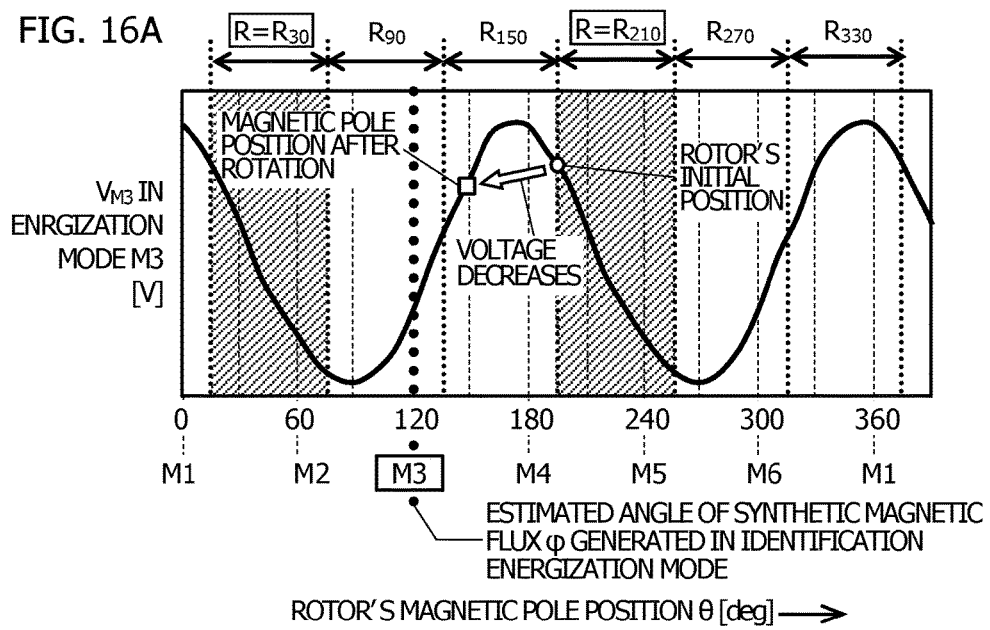
FIGS. 16A and 16B illustrate the case in which no loss of synchronism occurs in the brushless motor during energization according to the starting energization mode even though the initial rotor position is incorrectly identified, according to the embodiment.
Figure 16B:
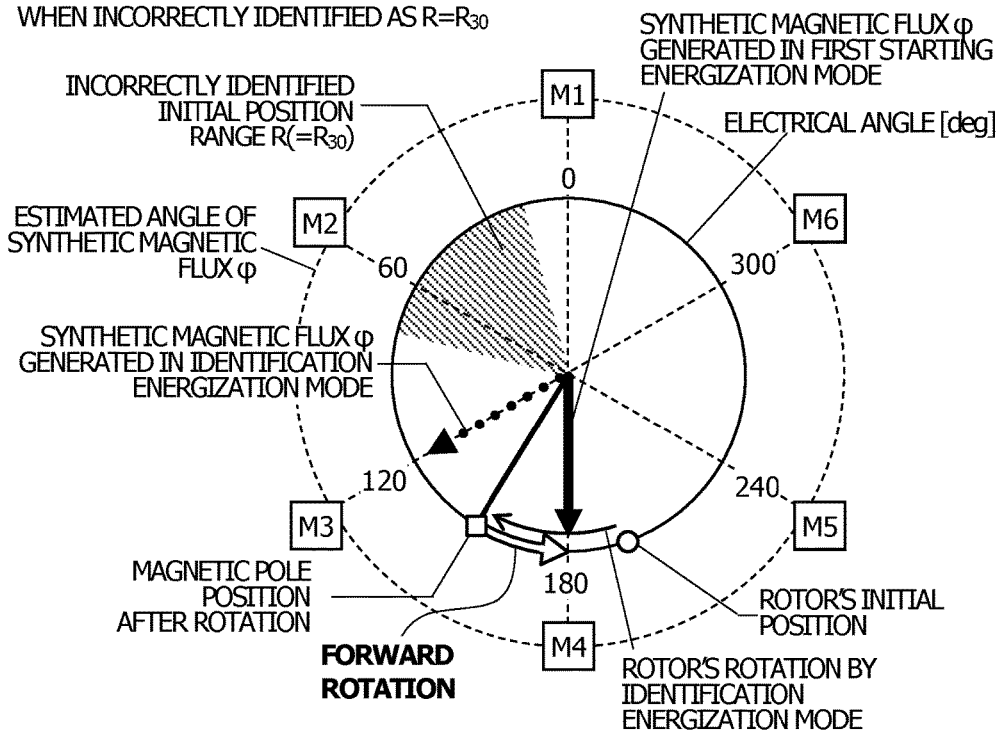

Here, as illustrated in FIG. 16A, when the actual initial position of rotor 120 is at a point within the angle range $R_{210}$ and relatively closer to the estimated angle of the synthetic magnetic flux φ generated by energization according to the energization mode M3, it is expected that, when rotor 120 is rotated by energization of the energization mode M3 set as the identification energization mode, control unit 220 may determine that the pulse induced voltage $V_{M3}$ has decreased. In such a case, as illustrated in FIG. 16B, control unit 220 incorrectly identifies the initial position of rotor 120 by mistakenly identifying, as the initial position range R, the angle range $R_{30}$, which does not actually include the initial position of rotor 120. Then, trying to rotate rotor 120 in the forward rotation direction after the initial position estimation processing, control unit 220 sets the first starting energization mode to the energization mode M4 that generates the synthetic magnetic flux φ at the angular position that is beyond the angle range $R_{30}$ incorrectly identified as the initial position range R and that is beyond the estimated angle of the synthetic magnetic flux φ generated according to the identification energization mode, and energizes brushless motor 100 according to the energization mode M4. As a result, even in such a case, rotor 120 is highly likely to actually rotate in the forward rotation direction since the magnetic pole position of rotor 120 after being rotated by energization according to the identification energization mode is less likely to beyond 180 degrees, which is the estimated angle of the synthetic magnetic flux φ generated by energization according to the energization mode M4. Here, the angle range $R_{30}$ is located on the reverse rotation side relative to 120 degrees, which is the estimated angle of the synthetic magnetic flux φ generated by energization according to the energization mode M3 set as the identification energization mode. Accordingly, when control unit 220 identifies the angle range $R_{30}$ as the initial position range R from among the two angle ranges $R_{30}$, $R_{210}$, each of which is provisionally determined as the initial position range R, control unit 220 may set the first starting energization mode to the energization mode M4 next to the energization mode M3, which is the identification energization mode, as described above.

After having energized brushless motor 100 according to the energization mode M4 set as the first starting energization mode for the predetermined time T in step S2028, control unit 220 may switch this first starting energization mode to the next energization mode (referred to as "second starting energization mode" below), which is the energization mode M5 in this case, and energize brushless motor 100 according to the energization mode M5 for the predetermined time T. In short, after having completed the initial position estimation processing, control unit 220 may perform the startup initiation processing prior to driving brushless motor 100 in the low-speed sensorless control according to the square wave drive method, by energizing brushless motor 100 either in a single energization session for predetermined time T according to the first starting energization mode or in N energization sessions by sequentially switching between the first to N-th starting energization modes each lapse of predetermined time T, where N is an integer greater than one.

Figure 17:
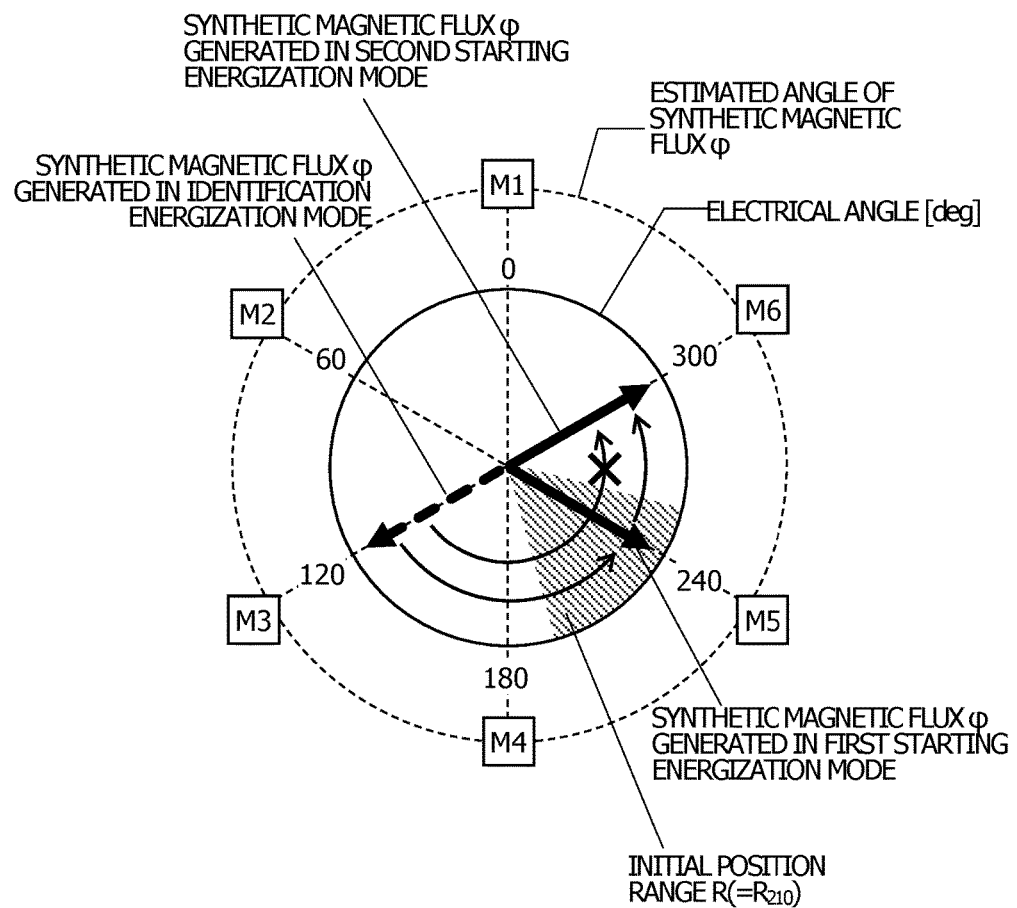
FIG. 17 illustrates energization according to the starting energization mode according to the embodiment.

Referring now to FIG. 17, assume here that control unit 220 drives brushless motor 100 in the low-speed sensorless control according to the square wave drive method immediately after having completed the initial position estimation processing to identify the angle range $R_{210}$ as the initial position range R in step S2027. In this case, the magnetic pole position of rotor 120 is likely to be beyond 60 degrees, at which control unit 220 switches from the energization mode M3 set as the identification energization mode to the energization mode M4. Thus, it is substantially impossible to switch from the energization mode M3 to the energization mode M4 in the low-speed sensorless control according to the square wave drive method.

Thus, when control unit 220 identifies the angle range $R_{210}$ as the initial position range R, control unit 220 sets, in step S2029, the first starting energization mode to the energization mode M5, which is next, next to the energization mode M3 set as the identification energization mode. Thereby, regardless of the magnetic pole position of rotor 120, control unit 220 forcefully energizes brushless motor 100 according to the energization mode M5 set as the first starting energization mode for the predetermined time T. Additionally, after having energized brushless motor 100 according to the energization mode M5 set as the first starting energization mode for the predetermined time T in step S2029, control unit 220 may switch this first starting energization mode to the second starting energization mode, which is the energization mode M6 in this case, and energize brushless motor 100 according to the energization mode M6 for the predetermined time T. In other words, similarly to step S2028, after having completed the initial position estimation processing, control unit 220 may perform the startup initiation processing by energizing brushless motor 100 either in a single energization session according to the first starting energization mode or in N energization sessions by sequentially switching between the first to N-th starting energization modes each lapse of predetermined time T, where N is an integer greater than one.

Referring now to FIG. 16A, it might be thought that when control unit 220 identifies the angle range $R_{210}$ as the initial position range R, control unit 220 performs the startup initiation processing by setting the energization mode M4 as the first starting energization mode and forcefully energizing brushless motor 100 according to the energization mode M4 for the time T. However, the magnetic pole position of rotor 120 after being rotated by energization according to the energization mode M3 set as the identification energization mode may be sometimes beyond 180 degrees, which is the estimated angle of the synthetic magnetic flux φ generated by energization according to the energization mode M4. In such a case, rotor 120 may be rotated in the reverse rotation direction by energization according to the energization mode M4. Therefore, it is not preferable to set the energization mode M4 as the first starting energization mode when the angle range $R_{210}$ is identified as the initial position range R.

Referring again to FIG. 16A, as an alternative, it might be thought that, when the angle range $R_{210}$ is identified as the initial position range R, control unit 220 sets the energization mode M6 as the first starting energization mode and forcefully energizing brushless motor 100 according to the energization mode M6 for the time T in order to rotate rotor 120 in the forward rotation direction. This is because energization according to the energization mode M6 generates the synthetic magnetic flux φ at an estimated angle of 300 degrees, which is beyond the initial position range R. However, in this embodiment, it is intentionally selected to cause control unit 220 to set the first starting energization mode to the energization mode M5 for generating the synthetic magnetic flux φ at an estimated angle of 240 degrees, which is within the initial position range R. The reason for this is as follows.

Figure 18A:
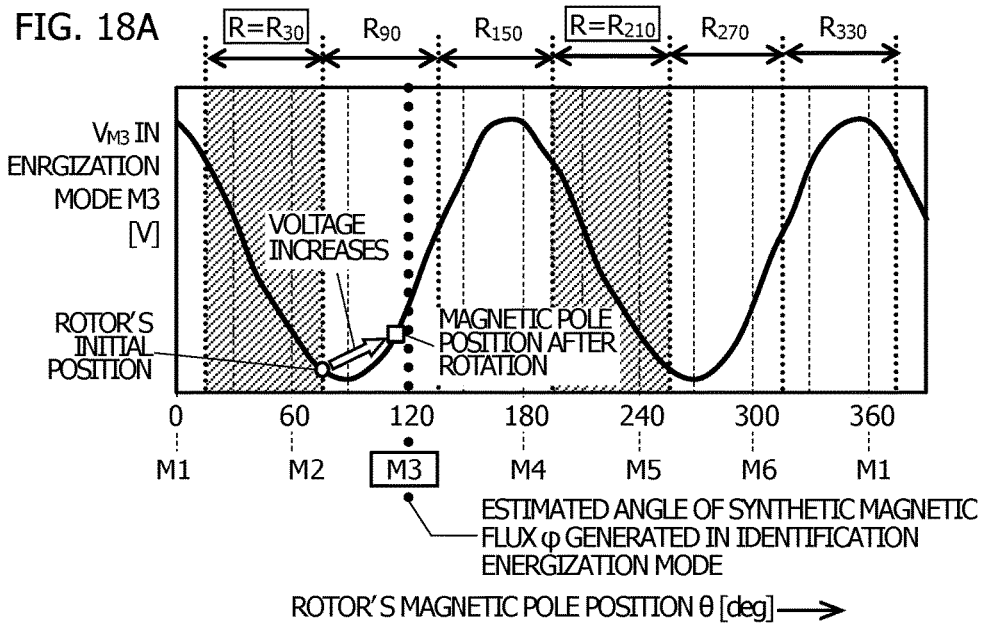
FIGS. 18A and 18B illustrate the case in which a loss of synchronism occurs in the brushless motor during energization according to the starting energization mode when the initial rotor position is incorrectly identified, according to the embodiment.
Figure 18B:
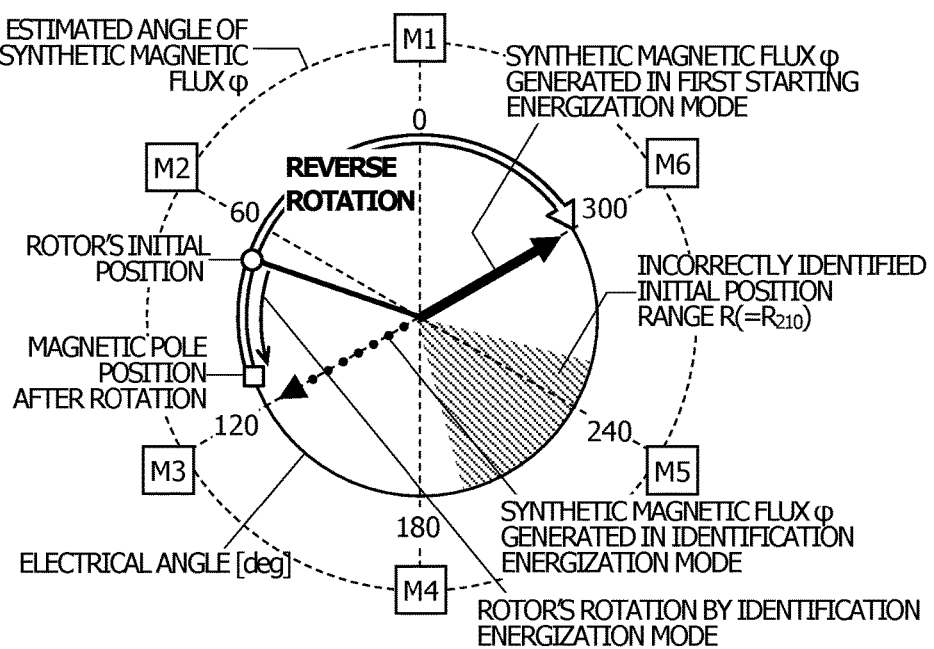

As illustrated in FIG. 18A, when control unit 220 provisionally determines that the initial position range R is each of the two angle ranges $R_{30}$, $R_{210}$ ($R=R_{30}$ & $R_{210}$), and when the actual initial position of rotor 120 is at a point within the angle range $R_{30}$ and relatively closer to the estimated angle of the synthetic magnetic flux φ generated by energization according to the energization mode M3, it is expected that, when rotor 120 is rotated by energization of the energization mode M3 set as the identification energization mode, control unit 220 may determine that the pulse induced voltage $V_{M3}$ has increased depending on the angular position of rotor 120 after the rotation. In such a case, as illustrated in FIG. 18B, control unit 220 incorrectly identifies the initial position of rotor 120 by mistakenly identifying the angle range $R_{210}$ as the initial position range R. Then, trying to rotate rotor 120 in the forward rotation direction after the initial position estimation processing, control unit 220 sets the first starting energization mode to the energization mode M6 that generates the synthetic magnetic flux φ at the angular position that is beyond the angle range $R_{210}$ incorrectly identified as the initial position range R, and energizes brushless motor 100 according to the energization mode M6. As a result, rotor 120 may rotate in the reverse rotation direction since the magnetic pole position of rotor 120 after being rotated by energization according to the identification energization mode is less likely to be beyond 120 degrees, which is the estimated angle of the synthetic magnetic flux φ generated by energization according to the energization mode M3.

Thus, when control unit 220 identifies the angle range $R_{210}$ as the initial position range R from among the two angle ranges $R_{30}$, $R_{210}$, each of which is provisionally determined as the initial position range R, control unit 220 sets the first starting energization mode to the energization mode M5 next, next to the energization mode M3, which is the identification energization mode, by skipping the next energization mode M4 in the startup initiation processing of step S2029. Here, the angle range $R_{210}$ is located on the forward rotation side relative to 120 degrees, which is the estimated angle of the synthetic magnetic flux φ generated by energization according to the energization mode M3 set as the identification energization mode.

Control unit 220 energizes brushless motor 100 according to the first to N-th starting energization modes (N is an integer greater than one) in the same manner as in the identification energization mode. Specifically, PWM signal generating unit 234 generates a PWM signal having a duty cycle that is forcefully set to a duty cycle for energization according to each of the first to N-th starting energization modes (referred to as "starting energization duty cycle"

below) and keeps transmitting each PWM signal to gate signal switching unit 236 for the predetermined time T. At the same time, regardless of the mode switching trigger from comparing unit 240, energization mode determining unit 238 keeps transmitting, to gate signal switching unit 236 for the predetermined time T, the mode command signal that forcefully directs the energization mode corresponding to each one of the first to N-th starting energization modes.

The starting energization duty cycle has a value that causes only slow rotation of the magnetic pole of rotor 120 toward the estimated angle of the synthetic magnetic flux φ generated upon energization according to the first starting energization mode such that no loss of synchronism occurs in brushless motor 100 during the sensorless control performed after completion of the startup initiation processing. For example, the starting energization duty cycle may have the same value as that of the identification energization duty cycle.

The predetermined time T is set in accordance with the starting energization duty cycle thus designated. Specifically, the predetermined time T has a length that causes a limited rotation of the magnetic pole of rotor 120 such that the magnetic pole position of rotor 120 do not go beyond the angle for switching to the next energization mode (see FIG. 5) when energization according to the first starting energization mode using the starting energization duty cycle is completed or, at the latest, when energization according to the N-th starting energization mode is completed. The predetermined time T may be the same regardless of which of the two provisionally determined angle ranges is finally identified as the initial position range R. Alternatively, however, the predetermined time T may vary by considering that these angle ranges differ in the angle difference between the magnetic pole position after rotor 120 has rotated by energization according to the identification energization mode and the estimated angle of the synthetic magnetic flux φ generated upon energization according to the first starting energization mode.

Before the operation proceeds to step S2037, control unit 220 finally identifies the angle range $R_{270}$ as the initial position range R (see step S2035). Here, the angle range $R_{270}$ is located on the reverse rotation side relative to 0 degrees, which is the estimated angle of the synthetic magnetic flux φ generated by energization according to the energization mode M1 set as the identification energization mode. Thus, control unit 220 performs the startup initiation processing in step S2037 by energizing brushless motor 100 first according to the energization mode M2 set as the first starting energization mode for the predetermined time T and then according to the energization mode M3 set as the second starting energization mode for the predetermined time T in the similar manner as in step S2028 described above. Similarly, before the operation proceeds to step S2046, control unit 220 identifies the angle range $R_{150}$ as the initial position range R (see step S2044). Here, the angle range $R_{150}$ is located on the reverse rotation side relative to 240 degrees, which is the estimated angle of the synthetic magnetic flux φ generated by energization according to the energization mode M5 set as the identification energization mode. Thus, control unit 220 performs the startup initiation processing in step S2046 by energizing brushless motor 100 first according to the energization mode M6 set as the first starting energization mode for the predetermined time T and then according to the energization mode M1 set as the second starting energization mode for the predetermined time T in the similar manner as in step S2028 described above.

Before the operation proceeds to step S2038, control unit 220 identifies the angle range $R_{90}$ as the initial position range R (see step S2036). Here, the angle range $R_{90}$ is located on the forward rotation side relative to 0 degree, which is the estimated angle of the synthetic magnetic flux φ generated by energization according to the energization mode M1 set as the identification energization mode. Thus, control unit 220 performs the startup initiation processing in step S2038 by energizing brushless motor 100 first according to the energization mode M3 set as the first starting energization mode for the predetermined time T and then according to the energization mode M4 set as the second starting energization mode for the predetermined time T in the similar manner as in step S2029 described above. Before the operation proceeds to step S2047, control unit 220 identifies the angle range $R_{330}$ as the initial position range R (see step S2045). Here, the angle range $R_{330}$ is located on the reverse rotation side relative to 240 degree, which is the estimated angle of the synthetic magnetic flux φ generated by energization according to the energization mode M5 set as the identification energization mode. Thus, control unit 220 performs the startup initiation processing in step S2047 by energizing brushless motor 100 first according to the energization mode M1 set as the first starting energization mode for the predetermined time T and then according to the energization mode M2 set as the second starting energization mode for the predetermined time T in the similar manner as in step S2029 described above.

In motor control apparatus 200 configured as above, control unit 220 first energizes brushless motor 100 according to the energization modes so as substantially not to rotate rotor 120, and detects the pulse induced voltages (six first induced voltages) $V_{M1}$, $V_{M2}$, $V_{M3}$, $V_{M4}$, $V_{M5}$, $V_{M6}$ generated in non-energized phases during energization according to the energization modes. Then, control unit 220 calculates the differences (induced voltage differences $D_{1-4}$, $D_{5-2}$, $D_{3-6}$) each between the pulse induced voltages generated in two energization modes that share a non-energized phase. Based on the size comparison between these three induced voltage differences $D_{1-4}$, $D_{5-2}$, $D_{3-6}$ thus calculated, control unit 220 provisionally determines, as the initial position range R, each of two angle ranges that are estimated to include the initial position of rotor 120. After that, control unit 220 rotates rotor 120 by energization according to the identification energization mode that is set depending on the provisionally determined angle ranges, and finally identifies the initial position range R from among the two provisionally determined angle ranges based on a change in the pulse induced voltage (second induced voltage) generated in a non-energized phase by the rotation of rotor 120.

As an alternative to the above, it might be considered that, if the three induced voltage sums $S_{1+4}$, $S_{5+2}$, $S_{3+6}$ are calculated in addition to the three induced voltage differences $D_{1-4}$, $D_{5-2}$, $D_{3-6}$, the single initial position range R of rotor 120 can be uniquely identified based on the size comparison of the three induced voltage differences $D_{1-4}$, $D_{5-2}$, $D_{3-6}$, and the size comparison of the three induced voltage sums $S_{1+4}$, $S_{5+2}$, $S_{3+6}$, as described above. However, as illustrated in FIG. 26, it is sometimes difficult to provide a definitive size comparison between the three induced voltage sums $S_{1+4}$, $S_{5+2}$, $S_{3+6}$ since the range of fluctuation of each induced voltage sum $S_{1+4}$, $S_{5+2}$, $S_{3+6}$ can be small depending on the magnetic circuit characteristics of brushless motor 100.

In contrast, by focusing on the fact that the induced voltage differences $D_{1-4}$, $D_{5-2}$, $D_{3-6}$ are less dependent on the magnetic circuit characteristics of brushless motor 100 than the induced voltage sums $S_{1+4}$, $S_{5+2}$, $S_{3+6}$, the motor control apparatus 200 estimates the initial position of rotor 120 based on the size comparison between the three induced voltage differences $D_{1-4}$, $D_{5-2}$, $D_{3-6}$ without using the three induced voltage sums $S_{1+4}$, $S_{5+2}$, $S_{3+6}$.

Therefore, motor control apparatus 200 according to this embodiment is capable of more accurately estimating the initial position of rotor 120 in brushless motor 100 having magnetic circuit characteristics that provides a relatively small range of fluctuations of the induced voltage sums $S_{1+4}$, $S_{5+2}$, $S_{3+6}$ than the case using the size comparison between the induced voltage sums $S_{1+4}$, $S_{5+2}$, $S_{3+6}$.

Next, a modification of motor control apparatus 200 according to the above embodiment will be described. The same reference numerals are given to the same components as those in the above embodiment, and the description thereof will be omitted or simplified.

In the above embodiment, based on which of the induced voltage differences $D_{1-4}$, $D_{5-2}$, $D_{3-6}$ is the maximum difference Dmax, one of the combinations of: the angle ranges $R_{30}$, $R_{210}$; the angle ranges $R_{90}$, $R_{270}$; and the angle ranges $R_{150}$, $R_{330}$ is provisionally determined as the initial position range R that is estimated to include the initial position of rotor 120.

Figure 19A:
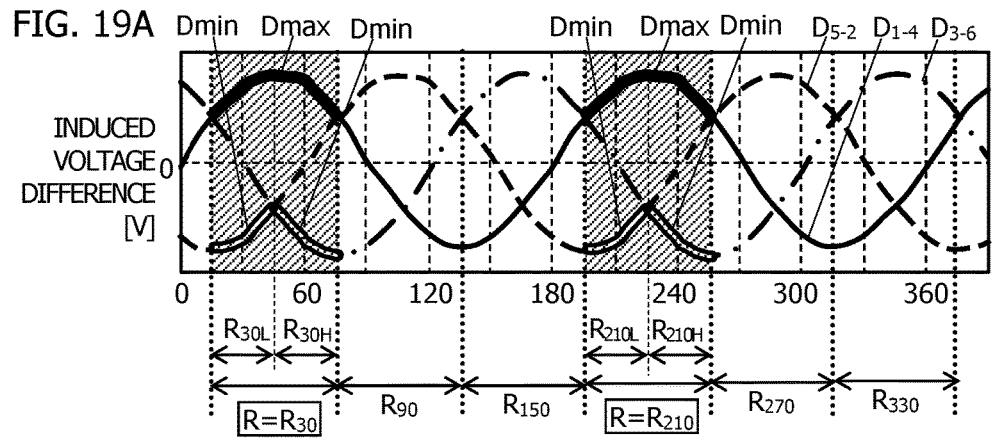
FIGS. 19A to 19C illustrate initial position estimation according to a modification of the embodiment by describing the changes from the embodiment.

Assume here that the induced voltage difference $D_{1-4}$ is the maximum difference Dmax. In this case, each of the angle range $R_{30}$ (from 15 degrees to 75 degrees, for example) and the angle range $R_{210}$ (from 195 degrees to 255 degrees, for example) is provisionally determined as the initial position range R. Furthermore, as illustrated in FIG. 19A, the induced voltage difference $D_{5-2}$ is the minimum difference Dmin within the angle range $R_{30L}$ (from 15 degrees to 45 degrees, for example), which is the lower half of the angle range $R_{30}$, and within the angle range $R_{210L}$ (from 195 degrees to 225 degrees, for example), which is the lower half of the angle range $R_{210}$. On the other hand, the induced voltage difference $D_{3-6}$ is the minimum difference Dmin within the angle range $R_{30H}$ (from 45 degrees to 75 degrees, for example), which is the upper half of the angle range $R_{30}$, and within the angle range $R_{210H}$ (from 225 degrees to 255 degrees, for example), which is the upper half of the angle range $R_{210}$.

Figure 19B:
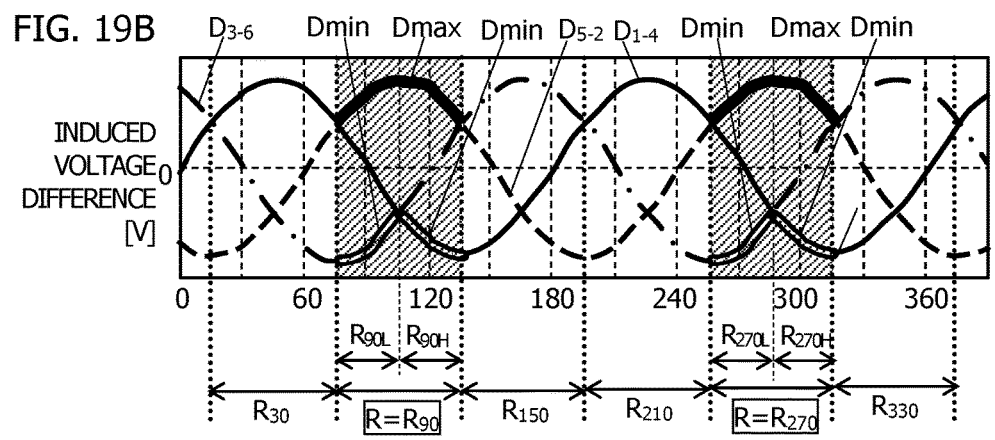

Similarly, assume here that the induced voltage difference $D_{5-2}$ is the maximum difference Dmax. In this case, each of the angle range $R_{90}$ (from 75 degrees to 135 degrees, for example) and the angle range $R_{270}$ (from 255 degrees to 315 degrees, for example) is provisionally determined as the initial position range R. Furthermore, as illustrated in FIG. 19B, the induced voltage difference $D_{3-6}$ is the minimum difference Dmin within the angle range $R_{90L}$ (from 75 degrees to 105 degrees, for example), which is the lower half of the angle range $R_{90}$, and within the angle range $R_{270L}$ (from 255 degrees to 285 degrees, for example), which is the lower half of the angle range $R_{270}$. On the other hand, the induced voltage difference $D_{1-4}$ is the minimum difference Dmin within the angle range $R_{90H}$ (from 105 degrees to 135 degrees, for example), which is the upper half of the angle range $R_{90}$, and within the angle range $R_{270H}$ (from 285 degrees to 315 degrees, for example), which is the upper half of the angle range $R_{270}$.

Figure 19C:
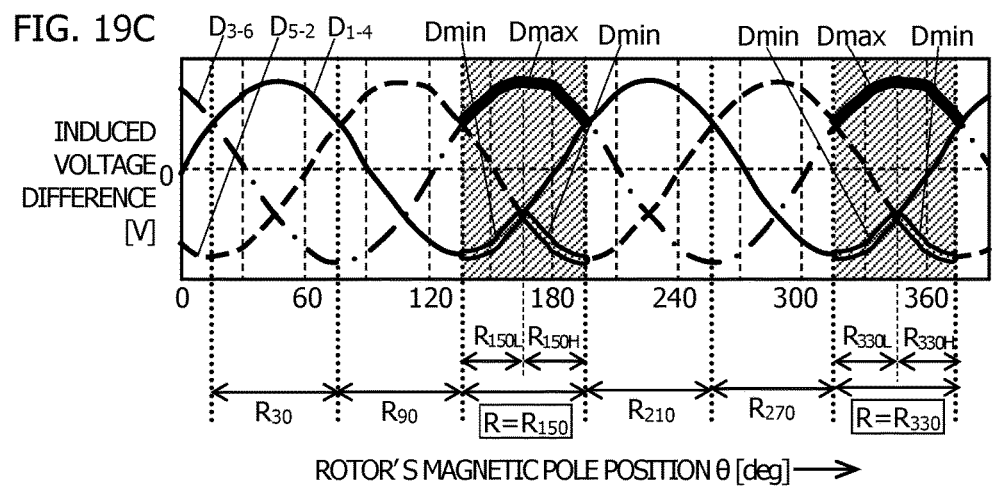

Similarly, assume here that the induced voltage difference $D_{3-6}$ is the maximum difference Dmax. In this case, each of the angle range $R_{150}$ (from 135 degrees to 195 degrees, for example) and the angle range $R_{330}$ (from 315 degrees to 15 degrees, for example) is provisionally determined as the initial position range R. Furthermore, as illustrated in FIG. 19C, the induced voltage difference $D_{1-4}$ is the minimum difference Dmin within the angle range $R_{150L}$ (from 135 degrees to 165 degrees, for example), which is the lower half of the angle range $R_{150}$, and within the angle range $R_{330L}$ (from 315 degrees to 345 degrees, for example), which is the lower half of the angle range $R_{330}$. On the other hand, the induced voltage difference $D_{5-2}$ is the minimum difference Dmin within the angle range $R_{150H}$ (from 165 degrees to 195 degrees, for example), which is the upper half of the angle range $R_{150}$, and within the angle range $R_{330H}$ (from 345 degrees to 15 degrees, for example), which is the upper half of the angle range $R_{330}$.

Accordingly, when it can be determined which of the induced voltage differences $D_{1-4}$, $D_{5-2}$, $D_{3-6}$ is the minimum difference Dmin in addition to which of the induced voltage differences $D_{1-4}$, $D_{5-2}$, $D_{3-6}$ is the maximum difference Dmax, the initial position range R may be further narrowed down. Specifically, it is possible to narrow down the initial position range R: from the angle range $R_{30}$ to the angle range $R_{30L}$ or $R_{30H}$; from the angle range $R_{90}$ to the angle range $R_{90L}$ or $R_{90H}$; from the angle range $R_{150}$ to the angle range $R_{150L}$ or $R_{150H}$; from the angle range $R_{210}$ to the angle range $R_{210L}$ or $R_{210H}$; from the angle range $R_{270}$ to the angle range $R_{270L}$ or $R_{270H}$; and from the angle range $R_{330}$ to the angle range $R_{330L}$ or $R_{330H}$. In other words, the determination of which of the induced voltage differences $D_{1-4}$, $D_{5-2}$, $D_{3-6}$ is the minimum difference Dmin allows identification of the minimum initial position range (minimum angle range) Rmin, which indicates whether the initial position of rotor 120 exists in the upper or lower half of the single angle range that is identified as the initial position range R.

FIGS. 20 and 21A to 21F describe changes from the flowchart of FIG. 8. As in the embodiment described above, control unit 220 identifies a single angle range as the initial position range R based on a change of the pulse induced voltage generated upon energization according to the identification energization mode in the initial position estimation processing. However, this modification differs from the above embodiment in the following respects. First, based on which of the induced voltage differences $D_{1-4}$, $D_{5-2}$, $D_{3-6}$ is the minimum difference Dmin, control unit 220 further identifies the minimum initial position range Rmin, which indicates whether the initial position of rotor 120 exists in the upper or lower half of this single angle range that is identified as the initial position range R. Furthermore, in accordance with the minimum initial position range Rmin thus identified, control unit 220 sets the predetermined time T defining how long brushless motor 100 is kept energized according to each of the first and second starting energization modes in the startup initiation processing.

Figure 20:
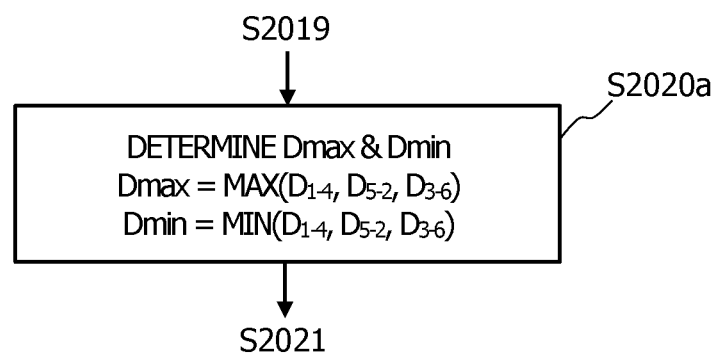
FIG. 20 is a flowchart for illustrating the changes from the flowchart of FIG. 8 in the modification of the embodiment.

As illustrated in FIG. 20, after calculating the induced voltage differences $D_{1-4}$, $D_{5-2}$, $D_{3-6}$ in step S2019, control unit 220 determines the minimum difference Dmin as well as the maximum difference Dmax from among the induced voltage differences $D_{1-4}$, $D_{5-2}$, $D_{3-6}$ in step S2020a, and the operation then proceeds to step S2021. After that, control unit 220 performs the processing in steps S2026, S2027, S2035, S2036, S2044, S2045, and identifies a single angle range as the initial position range R as in the above embodiment.

As illustrated in FIG. 21A, when having identified the angle range $R_{30}$ as the initial position range R in step S2026, control unit 220 moves the operation to step S2026a. When the induced voltage difference $D_{5-2}$ is the minimum difference Dmin (Yes), the operation proceeds to step S2026L. In step S2026L, control unit 220 identifies, as the minimum initial position range Rmin, the angle range $R_{30L}$, which is the lower half of the initial position range R (angle range $R_{30}$), and the operation proceeds to step S2028a. On the other hand, when the induced voltage difference $D_{5-2}$ is not the minimum difference Dmin (No) in step S2026a, the operation proceeds to step S2026b.

In step S2026b, control unit 220 moves the operation to step S2026H when the induced voltage difference $D_{3-6}$ is the minimum difference Dmin (Yes). In step S2026H, control unit 220 identifies, as the minimum initial position range Rmin, the angle range $R_{30H}$, which is the upper half of the initial position range R (angle range $R_{30}$), and the operation proceeds to step S2028b. On the other hand, when the induced voltage difference $D_{3-6}$ is not the minimum difference Dmin (No) in step S2026b, control unit 220 recognizes that the induced voltage differences $D_{5-2}$, $D_{3-6}$ share the same value, and the initial position of rotor 120 is at the border between the upper and lower halves of the angle range $R_{30}$. In response, the operation proceeds to step S2028c.

Control unit 220 performs the startup initiation processing in steps S2028a to S2028c. Specifically, based on that the angle range $R_{30}$ is identified as the initial position range R, control unit 220 sets the first starting energization mode to the energization mode M4, and energizes brushless motor 100 according to the energization mode M4 for the predetermined time T in the same manner as in step S2028 of the above embodiment. In steps S2028a to S2028c, control unit 220 may additionally set the energization mode M5 as the second starting energization mode, and energize brushless motor 100 according to the energization mode M5 for the predetermined time T in the same manner as in step S2028 of the above embodiment. Similarly to step S2028, control unit 220 may energize brushless motor 100 in N energization sessions according to the first to N-th starting energization modes, where N is an integer greater than one.

Here, the predetermined time T defining how long brushless motor 100 is kept energized according to each of the energization modes M4, M5 differs between steps S2028a, S2028b, S2028c. Specifically, the predetermined time T for step S2028a is predetermined time $T_{aL}$, for step S2028b is predetermined time $T_{aH}$, and for step S2028c is predetermined time $T_{aM}$, where predetermined time $T_{aH}$<predetermined time $T_{aM}$<predetermined time T.

Figure 22:
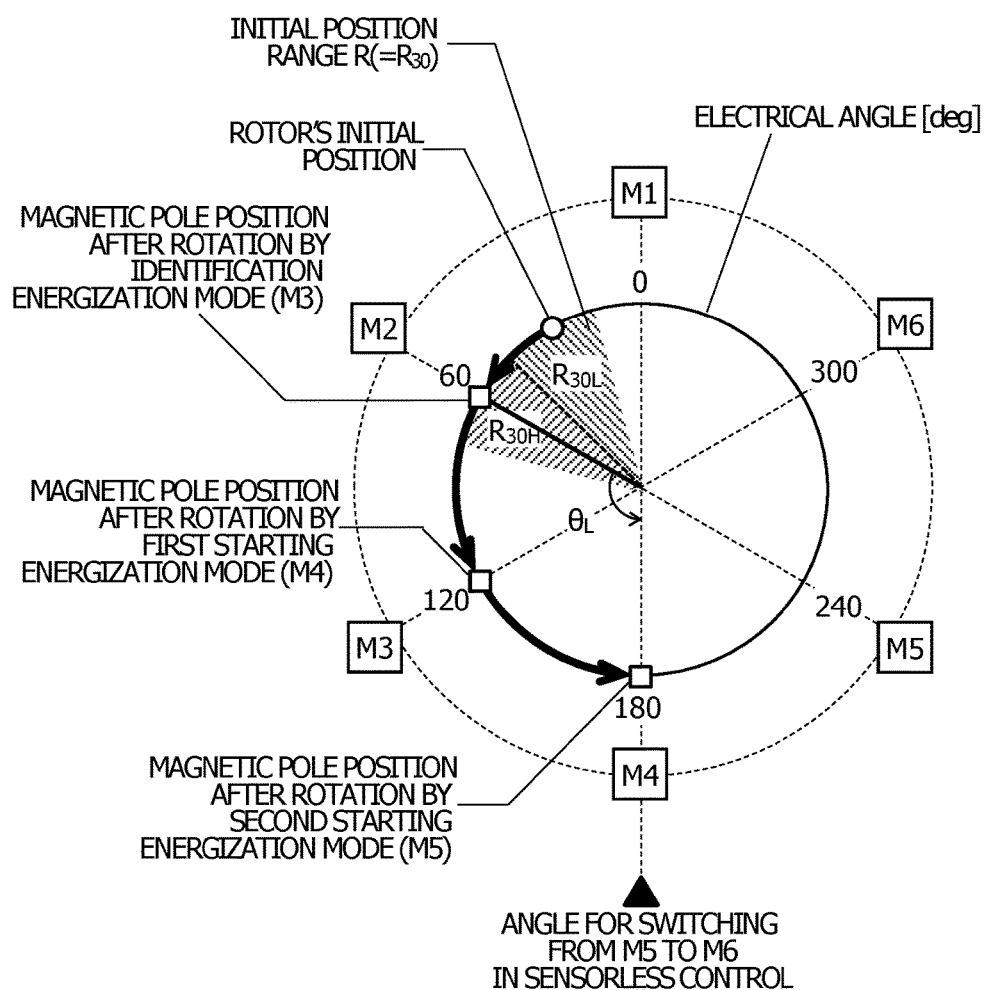
FIG. 22 illustrates an effect of the modification of the embodiment.
Figure 23:
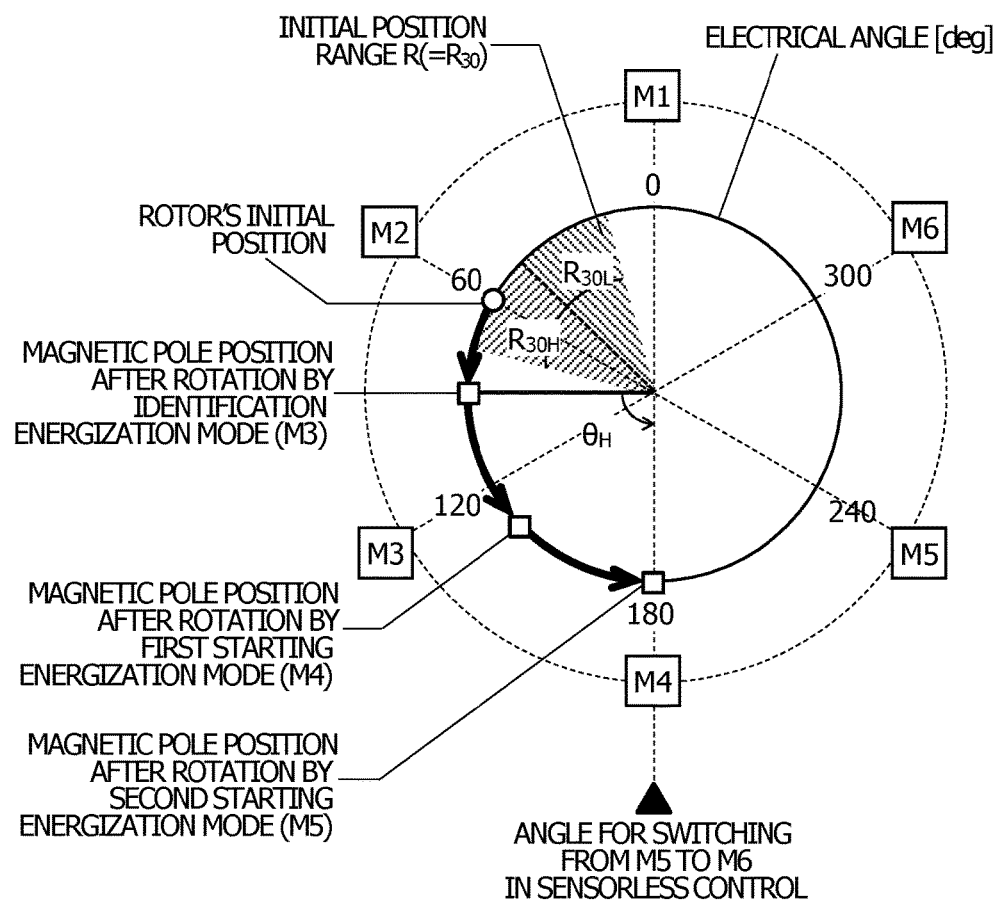
FIG. 23 illustrates the effect of the modification of the embodiment.

The reason why the different predetermined time values $T_{aL}$, $T_{aH}$, $T_{aM}$ are used is as follows. As illustrated in FIGS. 22 and 23, when the angle range $R_{30}$ (from 15 degrees to 75 degrees, for example) is identified as the initial position range R, the magnetic pole position of rotor 120 having rotated from its initial position by energization according to the identification energization mode (energization mode M3) is further moved by energization according to the energization mode M4 set as the first starting energization mode, and then by energization according to the energization mode M5 set as the second starting energization mode.

However, in order to start the sensorless control according to the square wave drive method after energization according to the second starting energization mode (energization mode M5), it is required to make sure that the magnetic pole position of rotor 120 is not beyond 180 degrees, at which control unit 220 switches from the energization mode M5 to the energization mode M6 (see FIG. 5).

Assume that rotor 120 is rotated at a substantially constant angle by energization according to the identification energization mode (energization mode M3). In addition, assume, for example, that the initial position of rotor 120 is at 30 degrees, so that the angle range $R_{30L}$, which is the lower half of the angle range $R_{30}$, is identified as the minimum initial position range Rmin. In such a case, as illustrated in FIG. 22, allowable rotation of rotor 120 before the start of energization by the square wave drive method is from the magnetic pole position of rotor 120 (60 degrees, for example) upon completion of the rotation caused by energization according to the identification energization mode to the angular position (180 degrees) at which the second starting energization mode (M5) is switched to the energization mode M6. Thus, the angle $\theta_L$ of the allowable rotation when the angle range $R_{30L}$ is identified as the minimum initial position range Rmin is 120 degrees (=180 degrees−60 degrees), for example. On the other hand, assume, for example, that the initial position of rotor 120 is at 60 degrees, so that the angle range $R_{30H}$, which is the upper half of the angle range $R_{30}$, is identified as the minimum initial position range Rmin. In such a case, as illustrated in FIG. 23, allowable rotation of rotor 120 before the start of energization by the square wave drive method is from the magnetic pole position of rotor 120 (90 degrees, for example) upon completion of the rotation caused by energization according to the identification energization mode to the angular position (180 degrees) at which the second starting energization mode (M5) is switched to the energization mode M6. Thus, the angle $\theta_H$ of the allowable rotation when the angle range $R_{30H}$ is identified as the minimum initial position range Rmin is 90 degrees (=180 degrees−90 degrees), for example. Therefore, allowable rotation angle $\theta_L$>allowable rotation angle $\theta_H$ holds.

In short, when the same starting energization duty cycle is used, it is preferable to adjust the predetermined time values $T_{aL}$, $T_{aH}$ such at least that the predetermined time $T_{aL}$ can be longer than the predetermined time $T_{aH}$ (predetermined time $T_{aH}$<predetermined time $T_{aL}$) in order to prevent loss of synchronism in brushless motor 100 during the sensorless control. Here, the predetermined time $T_{aL}$ defines how long brushless motor 100 is kept energized according to each of the first and second starting energization modes when the angle range $R_{30L}$, which is the lower half of the angle range $R_{30}$, is identified as the minimum initial position range Rmin. The predetermined time $T_{aH}$ defines how long brushless motor 100 is kept energized according to each of the first and second starting energization modes when the angle range $R_{30H}$, which is the upper half of the angle range $R_{30}$, is identified as the minimum initial position range Rmin.

The predetermined time $T_{aM}$ is used when neither of the upper and lower halves is identified as the minimum initial position range Rmin, and it is thus determined that the initial position of rotor 120 is at the border between the upper and lower halves of the angle range $R_{30}$. Thus, the predetermined time T may be set to a value between the predetermined time values $T_{aL}$, $T_{aH}$ (predetermined time $T_{aH}$<predetermined time $T_{aM}$<predetermined time $T_{aL}$). Alternatively, the predetermined time T may be set to the same value as either of the predetermined times $T_{aL}$, $T_{aH}$ (predetermined time $T_{aH}$≤predetermined time $T_{aM}$<predetermined time $T_{aL}$ or predetermined time $T_{aH}$<predetermined time $T_{am}$≤predetermined time $T_{aL}$).

Figure 21C:
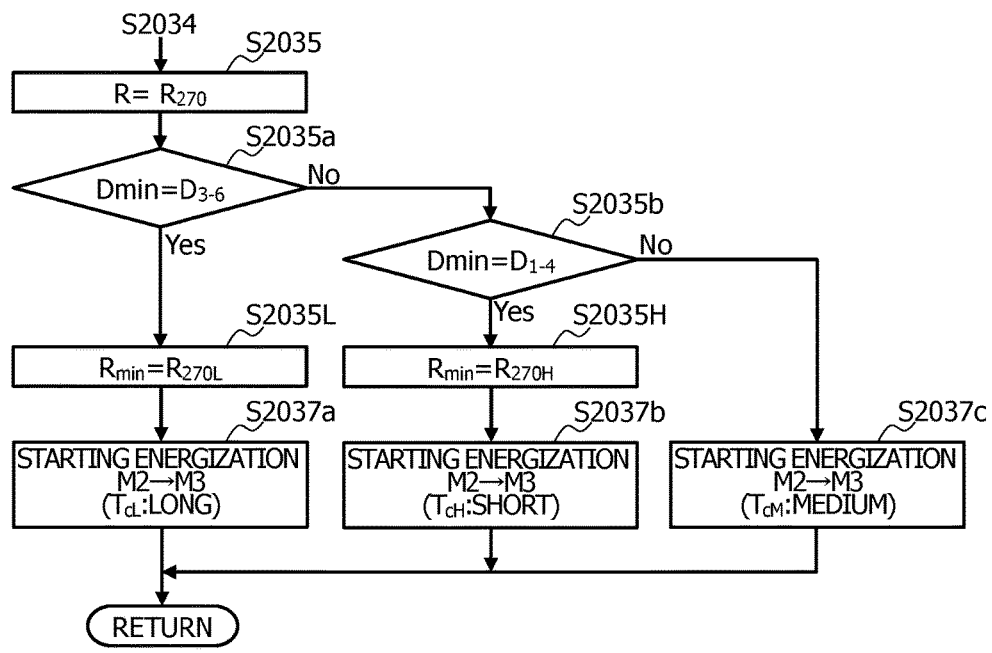

In FIGS. 21B to 21F, control unit 220 identifies the minimum initial position range Rmin and performs the startup initiation processing in the same manner as in FIG. 21A. Referring to FIG. 21B, when having identified the angle range $R_{210}$ as the initial position range R in step S2027, the predetermined time values $T_{bL}$, $T_{bH}$, $T_{bM}$ for defining how long brushless motor 100 is kept energized according to each of the first and second starting energization modes (energization modes M5, M6) during the startup initiation processing are set for the respective steps S2029a to S2029c. Here, the predetermined time $T_{bH}$ is used when the angle range $R_{210H}$, which is the upper half of the angle range $R_{210}$, is identified as the minimum initial position range Rmin in step S2027H, and the predetermined time $T_{bL}$ is used when the angle range $R_{210L}$, which is the lower half of the angle range $R_{210}$, is identified as the minimum initial position range Rmin in step S2027L. The predetermined time $T_{bL}$ is set longer than the predetermined time $T_{bH}$, so that predetermined time $T_{bH}$<predetermined time $T_{bM}$<predetermined time $T_{bL}$ holds.

Referring to FIG. 21C, when having identified the angle range $R_{270}$ as the initial position range R in step S2035, the predetermined time values $T_{cL}$, $T_{cH}$, $T_{cM}$ for defining how long brushless motor 100 is kept energized according to each of the first and second starting energization modes (energization modes M2, M3) during the startup initiation processing are set for the respective steps S2037a to S2037c. Here, the predetermined time $T_{cH}$ is used when the angle range $R_{270H}$, which is the upper half of the angle range $R_{270}$, is identified as the minimum initial position range Rmin in step S2035H, and the predetermined time $T_{cL}$ is used when the angle range $R_{270L}$, which is the lower half of the angle range $R_{270}$, is identified as the minimum initial position range Rmin in step S2035L. The predetermined time $T_{cL}$ is set longer than the predetermined time $T_{cH}$, so that predetermined time $T_{cH}$<predetermined time $T_{cM}$<predetermined time $T_{cL}$ holds.

Figure 21D:
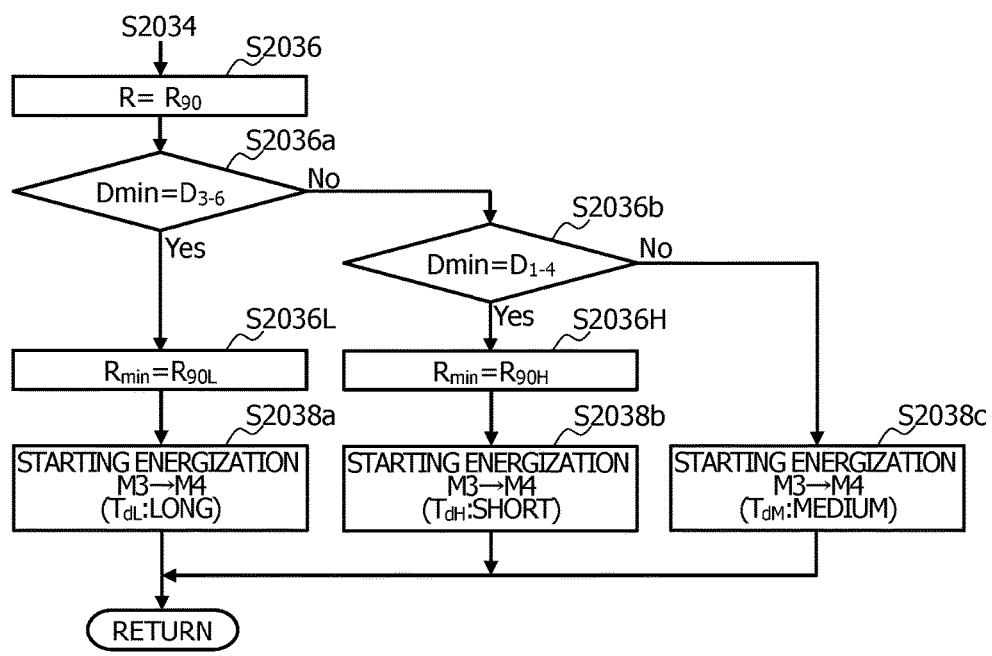

Referring to FIG. 21D, when having identified the angle range $R_{90}$ as the initial position range R in step S2036, the predetermined time values $T_{dL}$, $T_{dH}$, $T_{dM}$ for defining how long brushless motor 100 is kept energized according to each of the first and second starting energization modes (energization modes M3, M4) during the startup initiation processing are set for the respective steps S2038a to S2038c. Here, the predetermined time $T_{dH}$ is used when the angle range $R_{90H}$, which is the upper half of the angle range $R_{90}$, is identified as the minimum initial position range Rmin in step S2036H, and the predetermined time $T_{dL}$ is used when the angle range $R_{90L}$, which is the lower half of the angle range $R_{90}$, is identified as the minimum initial position range Rmin in step S2036L. The predetermined time $T_{dL}$ is set longer than the predetermined time $T_{dH}$, so that predetermined time $T_{dH}$<predetermined time $T_{dM}$<predetermined time $T_{dL}$ holds.

Figure 21E:
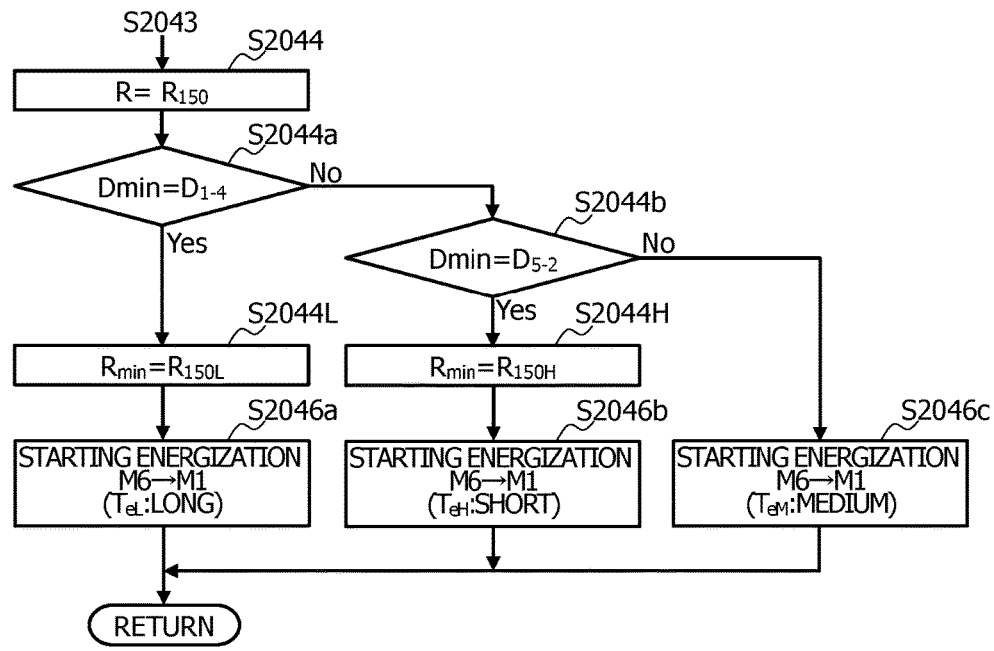

Referring to FIG. 21E, when having identified the angle range $R_{150}$ as the initial position range R in step S2044, the predetermined time values $T_{eL}$, $T_{eH}$, $T_{eM}$ for defining how long brushless motor 100 is kept energized according to each of the first and second starting energization modes (energization modes M6, M1) during the startup initiation processing are set for the respective steps S2046a to S2046c. Here, the predetermined time $T_{eH}$ is used when the angle range $R_{150H}$, which is the upper half of the angle range $R_{150}$, is identified as the minimum initial position range Rmin in step S2044H, and the predetermined time $T_{eL}$ is used when the angle range $R_{150L}$, which is the lower half of the angle range $R_{150}$, is identified as the minimum initial position range Rmin in step S2044L. The predetermined time $T_{eL}$ is set longer than the predetermined time $T_{eH}$, so that predetermined time $T_{eH}$<predetermined time $T_{eM}$<predetermined time $T_{eL}$ holds.

Figure 21F:
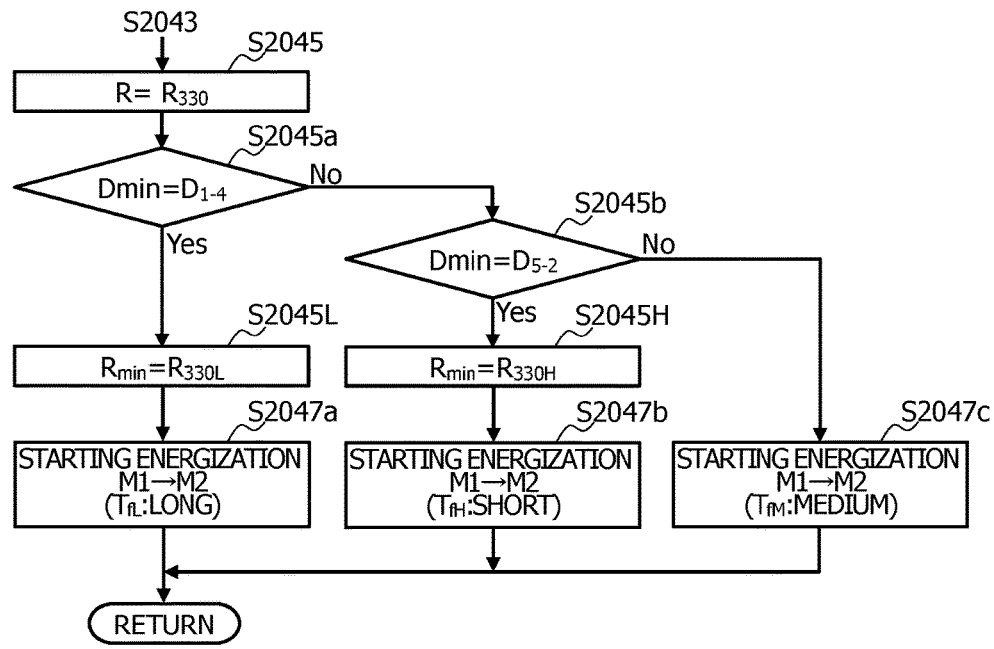

Referring to FIG. 21F, when having identified the angle range $R_{330}$ as the initial position range R in step S2045, the predetermined time values $T_{fL}$, $T_{fH}$, $T_{fM}$ for defining how long brushless motor 100 is kept energized according to each of the first and second starting energization modes (energization modes M1, M2) during the startup initiation processing are set for the respective steps S2047a to S2047c. Here, the predetermined time $T_{fH}$ is used when the angle range $R_{330H}$, which is the upper half of the angle range $R_{330}$, is identified as the minimum initial position range Rmin in step S2045H, and the predetermined time $T_{fL}$ is used when the angle range $R_{330L}$, which is the lower half of the angle range $R_{330}$, is identified as the minimum initial position range Rmin in step S2045L. The predetermined time $T_{fL}$ is set longer than the predetermined time $T_{fH}$, so that predetermined time $T_{fH}$<predetermined time $T_{fM}$<predetermined time $T_{fL}$ holds.

It is conceivable to set the predetermined times $T_{aL}$, $T_{bL}$, $T_{cL}$, $T_{dL}$, $T_{eL}$, $T_{fL}$ described above to the same value from each other as well as set the predetermined times $T_{aH}$, $T_{bH}$, $T_{cH}$, $T_{dH}$, $T_{eH}$, $T_{fH}$ described above to the same value from each other. However, the angle difference between the magnetic pole position of rotor 120 having rotated by energization according to the identification energization mode and the estimated angle of the synthetic magnetic flux φ generated upon energization according to the first starting energization mode may differ depending on whether the estimated angle of the synthetic magnetic flux φ generated by energization according to the identification energization mode is located on the forward rotation side as illustrated in FIG. 15 or on the reverse rotation side as illustrated in FIG. 16B relative to the initial position range R. Here, the predetermined time values $T_{aL}$, $T_{cL}$, $T_{eL}$ are used when the estimated angle of the synthetic magnetic flux φ generated by energization according to the identification energization mode is located on the forward rotation side relative to the initial position range R. On the other hand, the predetermined time values $T_{bL}$, $T_{dL}$, $T_{fL}$ are used when the estimated angle of the synthetic magnetic flux φ generated by energization according to the identification energization mode is located on the reverse rotation side relative to the initial position range R. Thus, each of the predetermined time values $T_{aL}$, $T_{cL}$, $T_{eL}$ may differ from each of the predetermined time values $T_{bL}$, $T_{dL}$, $T_{fL}$. The same may be applied to the relation between the predetermined time values $T_{aH}$, $T_{cH}$, $T_{eH}$ and the predetermined time values $T_{bH}$, $T_{dH}$, $T_{fH}$.

In the above embodiment and its modification, when each of the two angle ranges $R_{30}$, $R_{210}$ is provisionally determined as the initial position range R in step S2022, the energization mode M3 is set as the identification energization mode for energizing brushless motor 100 so as to identify the initial position range R from these two provisionally determined angle ranges $R_{30}$, $R_{210}$ in step S2023, for example. However, the present invention is not limited to this. The same goal may be achieved by energizing brushless motor 100 according to another energization mode (M1, M2, M4, M5, or M6).

Figure 24:
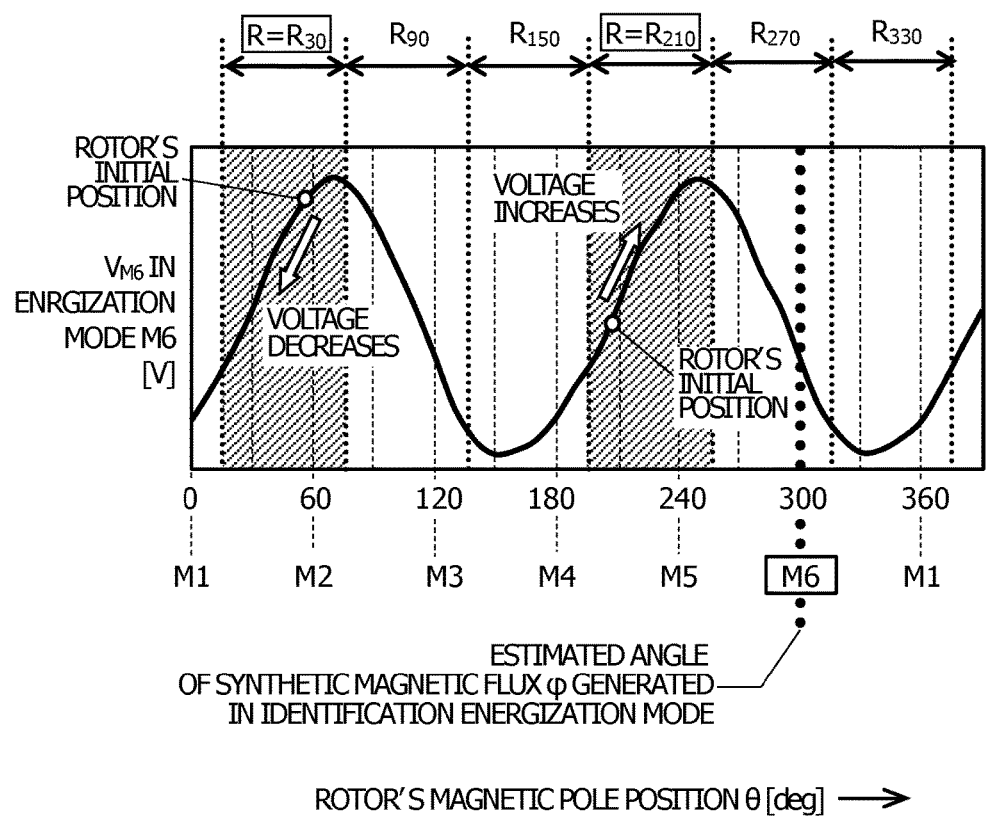
FIG. 24 illustrates a modification of the embodiment in which a different energization mode is used as the identification energization mode.

For example, the identification energization mode for energization in step S2023 may be set to the energization mode M6 in place of the energization mode M3. Here, as illustrated in FIG. 24, it has been known that the pulse induced voltage $V_{M6}$ changes in the following manner during energization according to the energization mode M6 set as the identification energization mode. When the initial position range R is the angle range $R_{210}$, the pulse induced voltage $V_{M6}$ generated in a non-energized phase substantially monotonically increases as rotor 120 rotates in the forward rotation direction. On the other hand, when the initial position range R is the angle range $R_{30}$, the pulse induced voltage $V_{M6}$ generated in the non-energized phase substantially decreases as rotor 120 rotates in the reverse rotation direction. Thus, when control unit 220 performs a plurality of detections of the pulse induced voltage $V_{M6}$ generated in the non-energized U phase in step S2024, and determines that the pulse induced voltage $V_{M6}$ has decreased in step S2025, control unit 220 may identify the angle range $R_{30}$ as the initial position range R. On the other hand, when control unit 220 determines that the pulse induced voltage $V_{M6}$ has increased in step S2025, control unit 220 may identify the angle range $R_{210}$ as the initial position range R.

Figure 25:
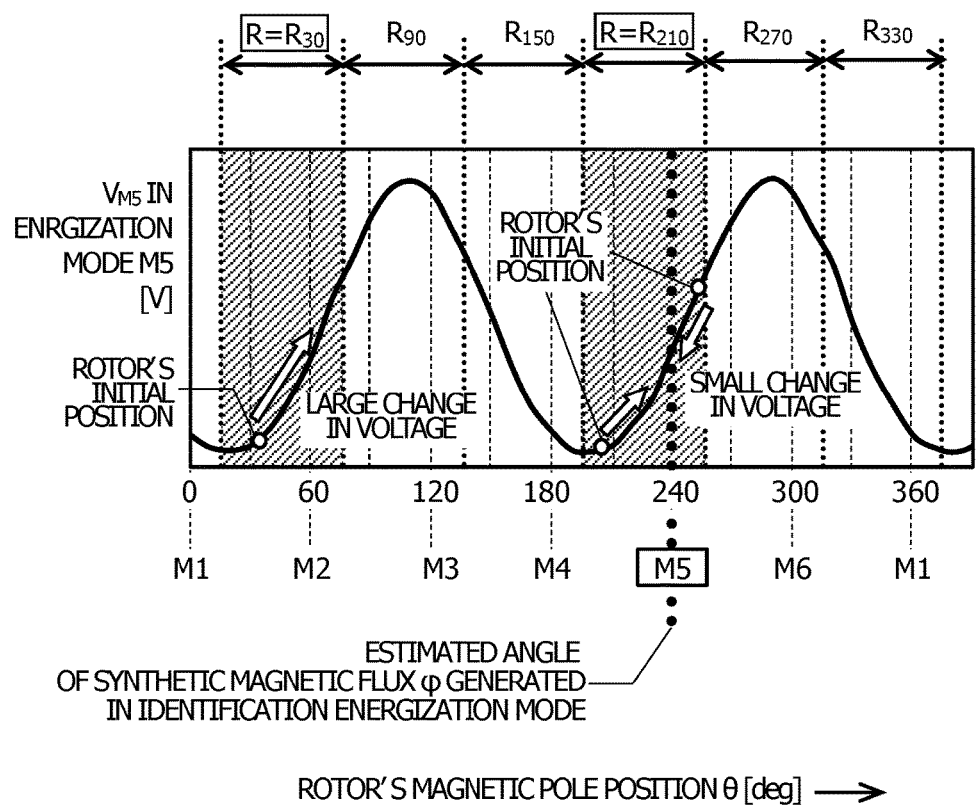
FIG. 25 illustrates a modification of the embodiment in which a different energization mode is used as the identification energization mode.

Alternatively, the identification energization mode for energization in step S2023 may be set to the energization mode M5 in place of the energization mode M3, for example. Here, as illustrated in FIG. 25, it has been known that, during energization according to the energization mode M5 set as the identification energization mode, the pulse induced voltage $V_{M5}$ generated in a non-energized phase changes in the substantially same manner along with the rotation angle of rotor 120 regardless of whether the initial position range R is the angle range $R_{30}$ or the angle range $R_{210}$. Incidentally, the estimated angle (240 degrees) of the synthetic magnetic flux φ generated upon energization according to the energization mode M5 is within the angle range $R_{210}$. Thus, when the initial position of rotor 120 is within the angle range $R_{210}$, rotor 120 virtually stays in the vicinity of 240 degrees. Thus, a change in the pulse induced voltage $V_{M5}$ in this case is highly likely to be smaller than when the initial position of rotor 120 is within the angle range $R_{30}$. Thus, when control unit 220 performs a plurality of detections of the pulse induced voltage $V_{M5}$ generated in the non-energized V phase in step S2024, and determines that the change in the pulse induced voltage $V_{M5}$ is above a predetermined value in step S2025, control unit 220 may identify the angle range $R_{30}$ as the initial position range R. On the other hand, when control unit 220 determines that the change in the pulse induced voltage $V_{M5}$ is below the predetermined value in step S2025, control unit 220 may identify the angle range $R_{210}$ as the initial position range R.

In the above embodiment and its modification, the starting energization duty cycle may vary depending on the amount of change in the pulse induced voltage generated in a non-energized phase by energization according to the identification energization mode. For example, referring to FIG. 10B, assume that brushless motor 100 is energized according to the energization mode M3 set as the identification energization mode. In this case, the amount of change of the pulse induced voltage $V_{M3}$ generated in the non-energized phase while rotor 120 rotates from the lower limit (15 degrees, for example) to the middle value (45 degrees, for example) of the angle range $R_{30}$ is about one half of that generated while rotor 120 rotates from the lower limit (15 degrees, for example) to the upper limit (75 degrees, for example) of the angle range $R_{30}$. In this way, as the amount of change in the pulse induced voltage $V_{M3}$ in the non-energized phase increases, the angular position of rotor 120 after being rotated by energization according to the identification energization mode is likely to be closer to the angle at which control unit 220 switches from the energization mode M5 to the energization mode M6 (180 degrees) in the sensorless control. Thus, as the amount of change in the pulse induced voltage $V_{M3}$ in the non-energized phase increases, the starting energization duty cycle as well as the predetermined time T may be reduced in order to limit the rotation of rotor 120 that is caused by energization according to the first and second starting energization modes. This further ensures no loss of synchronism occurs in brushless motor 100 after the start of the sensorless control.

REFERENCE SYMBOL LIST 100 brushless motor
110u, 110v, 110w three-phase coil
120 rotor
200 motor control apparatus
210 motor drive circuit
220 control unit
φ synthetic magnetic flux
M1 to M6 energization mode
$V_{M1}$ to $V_{M6}$ pulse induced voltage generated in non-energized phase in energization mode
$D_{1-4}$, $D_{5-2}$, $D_{3-6}$ induced voltage difference
T, $T_{aL}$, $T_{bL}$, $T_{cL}$, $T_{dL}$, $T_{eL}$, $T_{fL}$, $T_{aH}$, $T_{bH}$, $T_{cH}$, $T_{dH}$, $T_{eH}$, $T_{fH}$ predetermined time

The invention claimed is:

1. A drive device for a three-phase brushless motor, the drive device comprising:
a drive circuit for driving the three-phase brushless motor; and
a controller for outputting a control signal to the drive circuit so as to perform sensorless control by sequentially switching between six energization modes each for selecting two phases to be energized from three phases of the three-phase brushless motor, wherein
before performing the sensorless control,
the controller outputs, to the drive circuit, the control signal for momentarily energizing, as first energization, the three-phase brushless motor according to each of the six energization modes, and detects six first induced voltages each generated in a non-energized phase by the first energization, and calculates three induced voltage differences corresponding respectively to three non-energized phases, each induced voltage difference being a difference between two of the six first induced voltages that are detected during the first energization according to two energization modes that share a non-energized phase,
the controller outputs, to the drive circuit, the control signal for energizing, as second energization, the three-phase brushless motor according a predetermined energization mode set based on size comparison between the three induced voltage differences, and detects a second induced voltage generated in a non-energized phase along with a rotation of a rotor caused by the second energization performed subsequently to the first energization, and
the controller estimates an initial position of the rotor based on a change in the second induced voltage generated by the second energization.

2. The drive device for the three-phase brushless motor according to claim 1, wherein the controller estimates the initial position of the rotor by provisionally determining two angle ranges that are estimated to include the initial position of the rotor, based on the size comparison between the three induced voltage differences, and then by identifying one angle range that is estimated to include the initial position from among the two angle ranges, based on a change in the second induced voltage.

3. The drive device for the three-phase brushless motor according to claim 2, wherein
the controller identifies one of the two angle ranges as being estimated to include the initial position when the second induced voltage increases, and
the controller identifies the other one of the two angle ranges as being estimated to include the initial position when the second induced voltage decreases.

4. The drive device for the three-phase brushless motor according to claim 2, wherein the two angle ranges are provisionally determined based on the largest one of the three induced voltage differences.

5. The drive device for the three-phase brushless motor according to claim 2, wherein the controller switches the predetermined energization mode to one of the six energization modes that is next to the predetermined energization mode, when the one angle range is located on a reverse rotation side relative to an estimated angle of a synthetic magnetic flux of magnetic fluxes excited by the second energization according to the predetermined energization mode, and the controller switches the predetermined energization mode to one of the six energization modes that is next, next to the predetermined energization mode, when the one angle range is located on a forward rotation side relative to the estimated angle.

6. The drive device for the three-phase brushless motor according to claim 5, wherein, when the controller switches the predetermined energization mode to the one of the six energization modes that is next or next, next to the predetermined energization mode, the controller energizes the three-phase brushless motor according to the one energization mode for a predetermined time.

7. The drive device for the three-phase brushless motor according to claim 6, wherein the controller further identify, from within the one angle range, a minimum angle range that is estimated to include the initial position of the rotor, based on the smallest one of the three induced voltage differences.

8. The drive device for the three-phase brushless motor according to claim 7, wherein the predetermined time varies depending on the minimum angle range.

9. The drive device for the three-phase brushless motor according to claim 1, wherein the predetermined energization mode is determined based on the largest one of the three induced voltage differences.

10. The drive device for the three-phase brushless motor according to claim 1, wherein during the second energization according to the predetermined energization mode, the controller increases a voltage applied to the three-phase brushless motor until a change occurs in a detected value of the second induced voltage.

11. A drive method for a three-phase brushless motor, the drive method being used by a controller before the controller performs sensorless control by sequentially switching between six energization modes each for selecting two phases to be energized from three phases of the three-phase brushless motor, the drive method comprising:

detecting six first induced voltages each generated in a non-energized phase by momentarily energizing, as first energization, the three-phase brushless motor according to the corresponding one of the six energization modes;

calculating three induced voltage differences corresponding respectively to three non-energized phases, each induced voltage difference being a difference between two of the six first induced voltages that are detected during the first energization according to two energization modes that share a non-energized phase;

detecting a second induced voltage generated in a non-energized phase along with a rotation of a rotor caused by energizing, as second energization performed subsequently to the first energization, the three-phase brushless motor according a predetermined energization mode set based on size comparison between the three induced voltage differences; and estimating an initial position of the rotor based on a change in the second induced voltage generated by the second energization.

* * * * *